(12) United States Patent
Fang et al.

(10) Patent No.: US 12,328,707 B2
(45) Date of Patent: Jun. 10, 2025

(54) SYSTEMS AND METHODS FOR REDUCING UE POWER CONSUMPTION

(71) Applicant: ZTE CORPORATION, Guangdong (CN)

(72) Inventors: Huiying Fang, Shenzhen (CN); Bo Dai, Shenzhen (CN); Jianxun Al, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 314 days.

(21) Appl. No.: 17/934,844

(22) Filed: Sep. 23, 2022

(65) Prior Publication Data

US 2023/0072513 A1 Mar. 9, 2023

Related U.S. Application Data

(63) Continuation of application No. PCT/CN2020/120836, filed on Oct. 14, 2020.

(51) Int. Cl.
*H04W 68/02* (2009.01)
*H04W 56/00* (2009.01)
(Continued)

(52) U.S. Cl.
CPC ......... *H04W 68/02* (2013.01); *H04W 56/001* (2013.01); *H04W 72/0446* (2013.01); *H04W 72/0453* (2013.01)

(58) Field of Classification Search
CPC ............. H04W 72/0446; H04W 68/02; H04W 56/001; H04W 72/0453; H04W 74/0833;
(Continued)

(56) References Cited

U.S. PATENT DOCUMENTS 12,048,066 B2 * 7/2024 Palle Venkata ... H04W 74/0833
12,127,099 B2 * 10/2024 Palle Venkata ... H04W 74/0833
(Continued)

FOREIGN PATENT DOCUMENTS

CN 108430058 A 8/2018
CN 110168972 A 8/2019
(Continued)

OTHER PUBLICATIONS

Extended European Search Report on EP 20957037.3 dated Jun. 28, 2023 (9 pages).
(Continued)

*Primary Examiner* — Brian D Nguyen
(74) *Attorney, Agent, or Firm* — Foley & Lardner LLP

(57) ABSTRACT

Systems, methods and devices for reducing power consumption for reduced capability UEs can include using a dedicated common control resource set (CORESET) to reduce RF retuning in idle mode. The systems, methods and devices may include using the dedicated common CORESET and a dedicated initial downlink bandwidth part (DL BWP) to reduce RF retuning for reduced capability UEs. The systems, methods and devices may include using dedicated initial DL BWP to reduce RF retuning for reduced capability UEs. The systems, methods and devices include using simplified synchronization signal block (SSB) in DL BWP to reduce RF tuning by reduced capability UEs. The systems, methods and devices may include employing an indication in downlink control information (DCI) of whether the scheduled physical downlink shared channel (PDSCH) is for reduced capability UEs to avoid unnecessary PDSCH decoding.

18 Claims, 25 Drawing Sheets

(51) Int. Cl.
  *H04W 72/04* (2023.01)
  *H04W 72/0446* (2023.01)
  *H04W 72/0453* (2023.01)

(58) Field of Classification Search
  CPC .. H04W 68/005; H04L 5/0094; H04L 5/0044; H04L 5/0053; Y02D 30/70
  See application file for complete search history.

(56) References Cited

U.S. PATENT DOCUMENTS

| | | | |
|---|---|---|---|
| 2022/0046582 A1* | 2/2022 | Shrivastava | H04W 68/005 |
| 2022/0248410 A1* | 8/2022 | Lee | H04W 52/32 |
| 2023/0012497 A1* | 1/2023 | Lee | H04W 72/0453 |
| 2023/0179374 A1* | 6/2023 | Xu | H04L 5/0053 370/329 |
| 2023/0180110 A1* | 6/2023 | Kim | H04W 48/02 370/329 |
| 2024/0031909 A1* | 1/2024 | Yue | H04W 48/08 |

FOREIGN PATENT DOCUMENTS

| | | |
|---|---|---|
| WO | WO-2019/049348 A1 | 3/2019 |
| WO | WO-2020/145747 A1 | 7/2020 |

OTHER PUBLICATIONS

ZTE: "Potential UE complexity reduction features" 3GPP TSG RAN WG1#102-e, R1-2005474, Aug. 17-20, 2020, e-Meeting (19 pages).

CMCC: "Discussion on framework of reduced capability NR devices" 3GPP TSG RAN WG1 #101; R1-2003969; Jun. 5, 2020; e-Meeting (4 pages).

CMCC: "Discussion on principles and framework of reduced capability NR" 3GPP TSG RAN WG1 #102-e; R1-2006220; Aug. 28, 2020; e-Meeting (4 pages).

International Search Report and Written Opinion for PCT Appl. No. PCT/CN2020/120836, mailed Jul. 15, 2021 (8 pages).

Mediatek Inc: "Evaluation methodology and paging enhancements for idle/inactive mode UE power saving" 3GPP TSG RAN WG1 #102-e; R1-2005615; Aug. 28, 2020; e-Meeting (11 pages).

Hearing Notice for IN App. No. 202227054609 dated Mar. 3, 2025 (with English translation, 2 pages).

\* cited by examiner

300

Transmit/Receive a paging message within a frequency-domain resource corresponding to a CORESET configured for a reduced capability wireless communication device — 302

```
Transmit/Receive a downlink control information that is configured to schedule
a message. The downlink control information using one or more reserved bits indicating
at least one of whether the scheduled message is applicable for RedCap UE devices,
or for which type of the RedCap UE devices the scheduled message is applicable.
```
502

FIG. 20

SYSTEMS AND METHODS FOR REDUCING UE POWER CONSUMPTION

CROSS-REFERENCE TO RELATED APPLICATION

This application claims the benefit of priority under 35 U.S.C. § 120 as a continuation of PCT Patent Application No. PCT/CN2020/120836, filed on Oct. 14, 2020, the disclosure of which is incorporated herein by reference in its entirety.

TECHNICAL FIELD

The disclosure relates generally to wireless communications, including but not limited to systems and methods for reducing user equipment (UE) power consumption.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A first wireless communication device may receive, from a wireless communication node, a paging message within a frequency-domain resource. The frequency-domain resource may correspond to a control resource set (CORESET) configured for the first wireless communication device. The first wireless communication device may be a reduced capability user equipment (UE) device.

In some embodiments, a starting position of the frequency-domain resource may be aligned with a starting position of a CORESET 0, and the CORESET 0 may configured for a second wireless communication device that is not a reduced capability UE device. A ratio of a frequency-domain size of the frequency-domain resource to a frequency-domain size of the CORESET 0 may be one of 1, ½ or ¼. A starting position of the frequency-domain resource may be aligned with a starting position of a synchronization signal block (SSB) along a frequency domain. An ending position of the frequency-domain resource may be aligned with an ending position of a synchronization signal block (SSB) along a frequency domain. A starting position of the frequency-domain resource may be an offset from a starting position of a CORESET 0 or a starting position of a synchronization signal block (SSB), and the offset may be configured in a system information. A frequency-domain size of the frequency-domain resource may not be larger than the maximum bandwidth of the first wireless communication device.

In some embodiments, the wireless communication device may receive, in response to receiving the paging message, system information, random access response (RAR) message or Msg4 in a frequency-domain resource including a whole CORESET 0 that is configured for a second wireless communication device. The second wireless communication device may not be a reduced capability UE device.

At least one aspect is directed to a system, method, apparatus, or a computer-readable medium. A first wireless communication device may receive system information within a first frequency-domain resource configured for a second wireless communication device. The first wireless communication device may determine, from the system information, a second frequency-domain resource and a third frequency-domain resource configured for the first wireless communication device that is a reduced capability UE device.

In some embodiments, the first frequency-domain resource may correspond to a CORESET configured for the second wireless communication device. The second frequency-domain resource may correspond to a bandwidth part (BWP) and the third frequency-domain resource may correspond to a CORESET. The third frequency-domain resource may be within the second frequency-domain resource. In some embodiments, the first wireless communication device may monitor a downlink control information (DCI) within the third frequency-domain resource. The downlink control information (DCI) may be used to schedule at least one of a Random Access Response (RAR) message, a Msg4 or a paging message. In some embodiments, the first wireless communication device may receive a message scheduled in the second frequency-domain resource. The message may include at least one of a Random Access Response (RAR) message, a Msg4 or a paging message. The second frequency-domain resource may include a whole frequency region of synchronization signal blocks (SSBs).

At least one aspect is directed to a system, method, apparatus, or a computer-readable medium. A first wireless communication device may receive, from a wireless communication node, a downlink control information (DCI) that is configured to schedule a message. The downlink control information (DCI) may indicate at least one of whether the scheduled message is applicable for reduced capability user equipment (UE) devices, or for which type of UE devices the scheduled message is applicable.

In some embodiments, the scheduled message may include at least one of a scheduled paging message or a scheduled system information (SI) message. The downlink control information may use one or more reserved bits to indicate at least one of whether the scheduled message is applicable for reduced capability user equipment (UE) devices, or for which type of UE devices the scheduled message is applicable.

At least one aspect is directed to a system, method, apparatus, or a computer-readable medium. A wireless communication node may transmit, to first a wireless communication node, a paging message within a frequency-domain resource. The frequency-domain resource may correspond to a control resource set (CORESET) configured for the first wireless communication device. The first wireless communication device may be a reduced capability user equipment (UE) device.

In some embodiments, a starting position of the frequency-domain resource may be aligned with a starting position of a CORESET 0, and the CORESET 0 may configured for a second wireless communication device that is not a reduced capability UE device. A ratio of a frequency-domain size of the frequency-domain resource to a frequency-domain size of the CORESET 0 may be one of 1, ½ or ¼. A starting position of the frequency-domain resource may be aligned with a starting position of a synchronization signal block (SSB) along a frequency domain. A starting position of the frequency-domain resource may be aligned with an ending position of a synchronization signal block (SSB) along a frequency domain. An ending position of the frequency-domain resource may be an offset from a starting position of a CORESET 0 or a starting position of a synchronization signal block (SSB), and the offset may be configured in a system information. A frequency-domain size of the frequency-domain resource may not be larger than the maximum bandwidth of the first wireless communication device.

In some embodiments, the wireless communication node may transmit, in response to transmitting the paging message, system information, random access response (RAR) message or Msg4 in a frequency-domain resource including a whole CORESET 0 that is configured for a second wireless communication device. The second wireless communication device may not be a reduced capability UE device.

At least one aspect is directed to a system, method, apparatus, or a computer-readable medium. A wireless communication node may transmit, to a first wireless communication device, system information within a first frequency-domain resource configured for a second wireless communication device. The system information may be used by the first wireless communication device, that is a reduced capability UE device, to determine a second frequency-domain resource and a third frequency-domain resource configured for the first wireless communication device.

In some embodiments, the first frequency-domain resource may correspond to a CORESET configured for the second wireless communication device. The second frequency-domain resource may correspond to a bandwidth part (BWP) and the third frequency-domain resource may correspond to a CORESET. The third frequency-domain resource may be within the second frequency-domain resource. In some embodiments, the wireless communication node may insert a downlink control information (DCI) within the third frequency-domain resource. The downlink control information (DCI) may be monitored by the first wireless communication device and may be used to schedule at least one of a Random Access Response (RAR) message, a Msg4 or a paging message. In some embodiments, the wireless communication node may transmit a message scheduled in the second frequency-domain resource. The message may include at least one of a Random Access Response (RAR) message, a Msg4 or a paging message. The second frequency-domain resource may include a whole frequency region of synchronization signal blocks (SSBs).

At least one aspect is directed to a system, method, apparatus, or a computer-readable medium. A wireless communication node may transmit, to a first wireless communication device, a downlink control information (DCI) that is configured to schedule a message. The downlink control information (DCI) may use one or more reserved bits indicating at least one of whether the scheduled message is applicable for reduced capability user equipment (UE) devices, or for which type of UE devices the scheduled message is applicable.

In some embodiments, the scheduled message may include at least one of a scheduled paging message or a scheduled system information (SI) message. The downlink control information may use one or more reserved bits to indicate at least one of whether the scheduled message is applicable for reduced capability user equipment (UE) devices, or for which type of UE devices the scheduled message is applicable.

Some other embodiments described herein provide solutions for to reduce the UE power consumption. These solutions include using dedicated common control resource set (CORESET) for paging for reduced capability UEs to reduce radio frequency (RF) retuning in idle mode. The solutions include using dedicated common CORESET and dedicated initial downlink bandwidth part (DL BWP) to reduce RF retuning for reduced capability UEs. The solutions include using dedicated initial DL BWP to reduce RF retuning for reduced capability UEs. The solutions include introducing and using simplified synchronization signal block (SSB) in DL BWP to reduce RF tuning by reduced capability UEs. The solutions include employing an indication in downlink control information (DCI) of whether the scheduled physical downlink shared channel (PDSCH) is for reduced capability UEs to avoid unnecessary PDSCH decoding.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 7 shows a flowchart illustrating a method for wireless communication, in accordance with some embodiments of the present disclosure;

FIG. 20 is a flowchart illustrating a method 500 for wireless communication, according to some example embodiments of the present disclosure.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
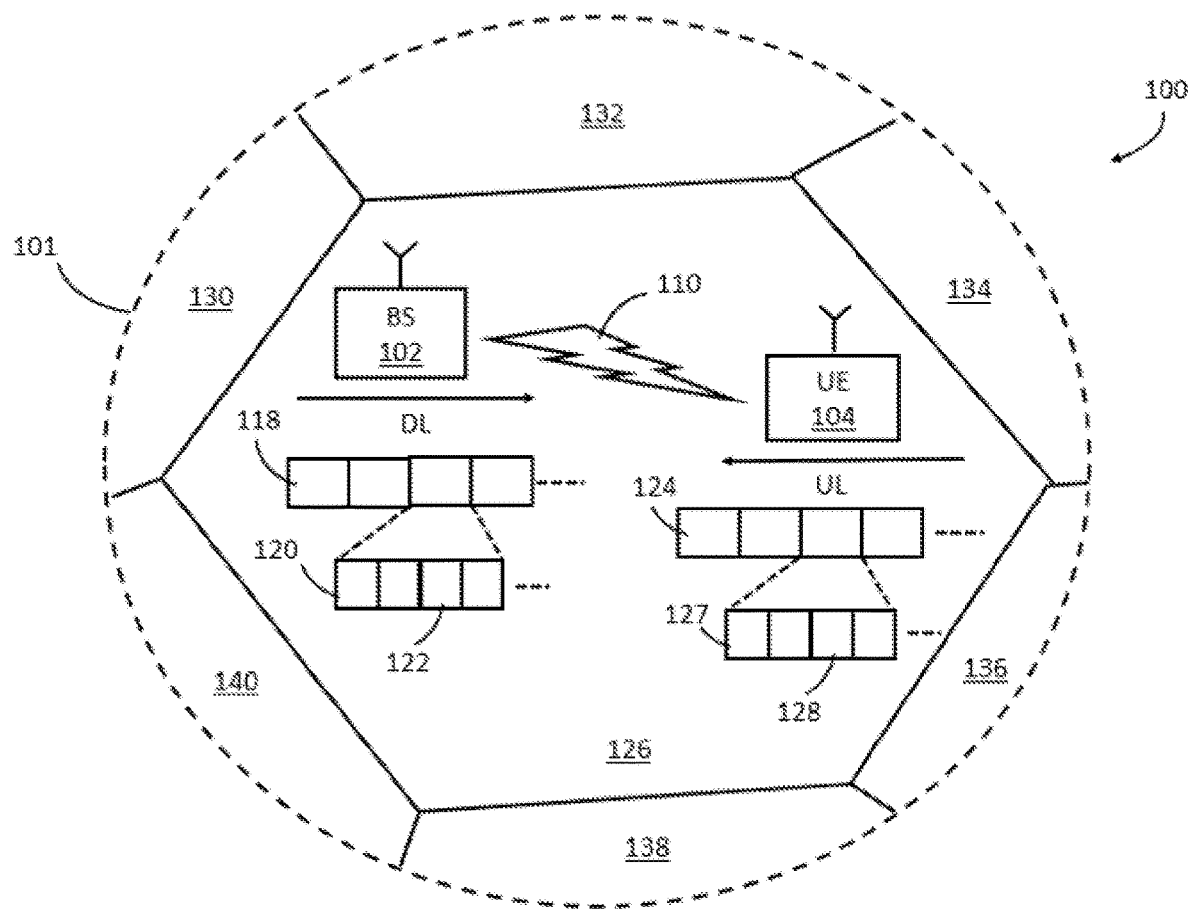
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a $5^{th}$ Generation (5G) new radio (NR) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127, which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
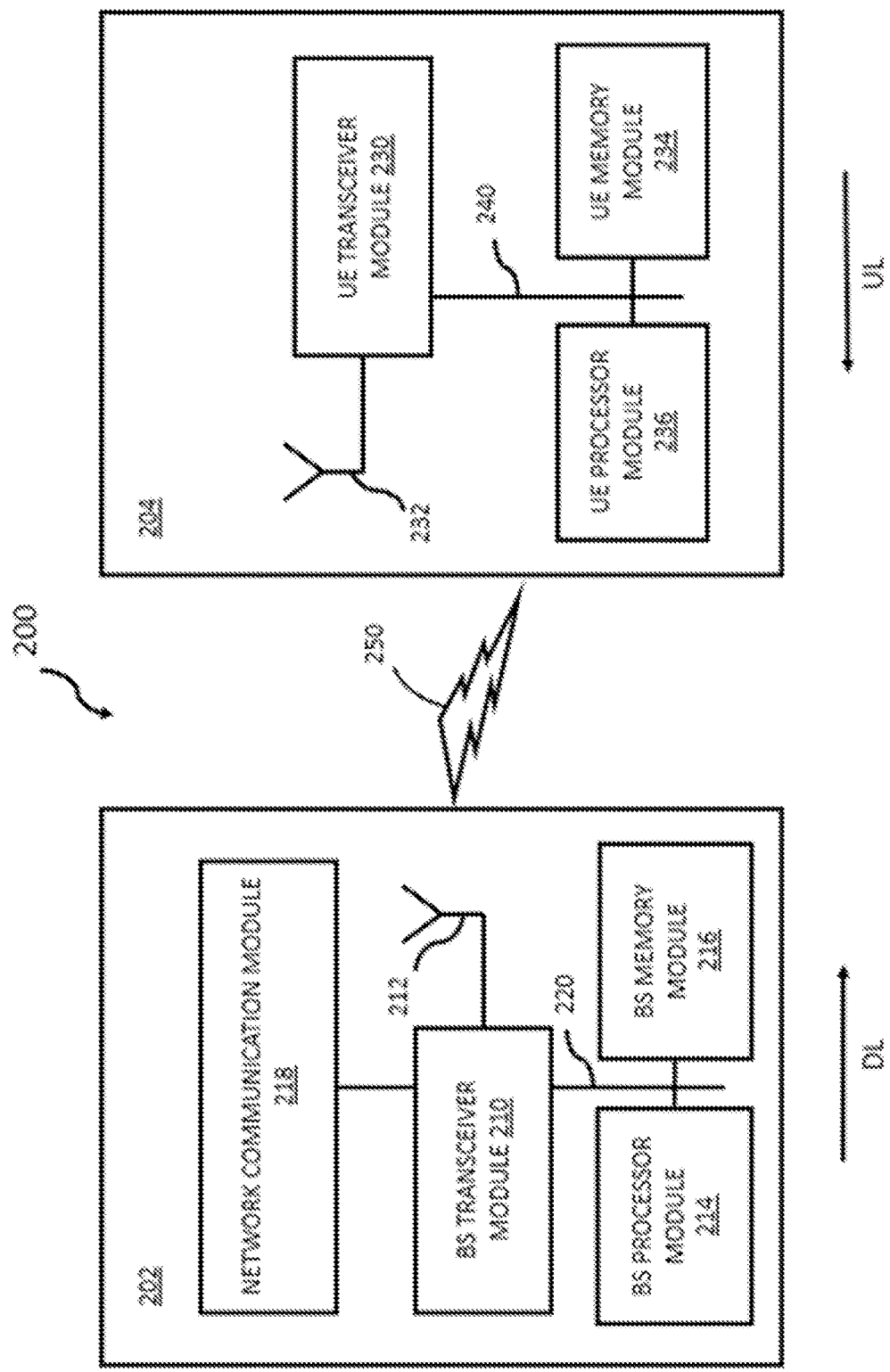
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Reducing UE Power Consumption

In $5^{th}$ Generation (5G) new radio (NR), the maximum carrier bandwidth is up to 100 in frequency range 1 (FR1), which extends from 450 MHz to 6 GHz, and up to 400 MHz in frequency range 2 (FR2), which extends from 24.25 GHz to 52.6 GHz. However, for reduced capability user equipments (UEs), the maximum UE bandwidth may be reduced to 20 MHz in FR1 and 50 MHz or 100 MHz in FR2. As used herein, reduced capability (RedCap) wireless communication devices (or UEs) may have smaller bandwidth than the bandwidth allowed by the wireless network for each UE, less number of antenna than other UEs or relaxed processing capabilities compared to other UEs or a given reference. For synchronization signal block (SSB) and control resource set (CORESET) multiplexing pattern 2 in FR2, the total bandwidth of SSB and CORESET 0 may be larger than 100 MHz. Note that each SSB spreads over 240 subcarriers or 20 resource blocks (RBs), while CORSET 0 may include 48 RBs.

Figure 3:
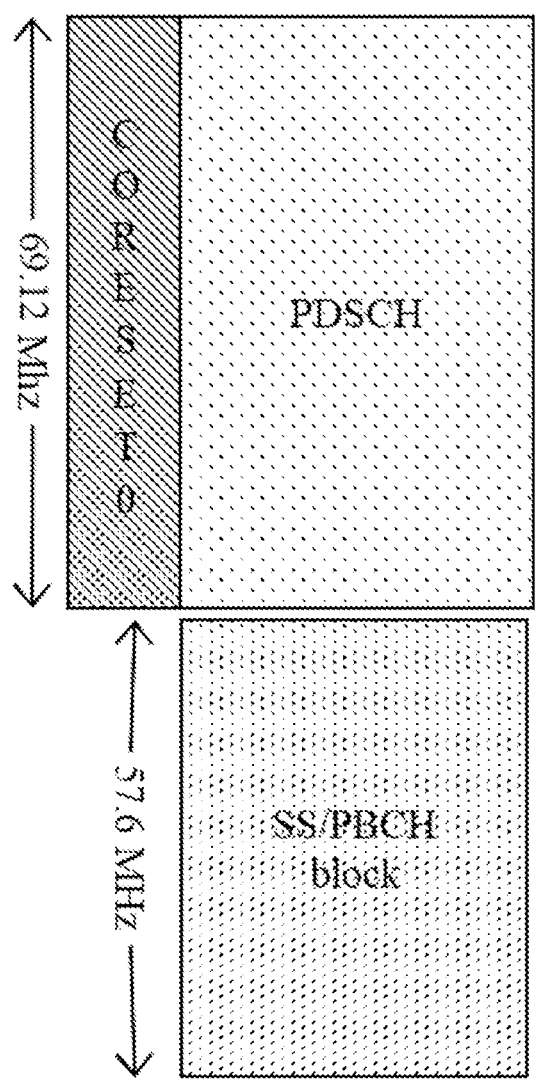
FIG. 3 illustrates an example scenario where the total bandwidth of SSB and CORESET 0 may be larger than the maximum bandwidth of a reduced capability wireless communication device (or UE)

Referring to FIG. 3, an example scenario where the total bandwidth of SSB and CORESET 0 may be larger than the maximum bandwidth of a reduced capability wireless communication device (or UE). For instance, the bandwidth of SSB is equal to 57.6 MHz and the bandwidth of CORESET 0 is equal to 69.12 MHz, leading to a total bandwidth larger than 126.72 MHz, considering the gap between SSB and CORESET0. During initial access, normal NR wireless communication devices (or normal NR UEs) detect system information block 1 (SIB1), other system information (SIs), random access response (RAR) and Msg4 in CORESET 0. For reduced capability wireless communication devices (or reduced capability UEs), if total bandwidth of SSB and CORESET 0 is larger than the maximum UE bandwidth, the reduced capability wireless communication device will retune to the corresponding frequency region to decode signals.

After the initial access procedure, the wireless communication device may apply the initial downlink bandwidth part (DL BWP) if it is configured in SIB1. If not to be switched to another radio resource control (RRC) configured BWP, the wireless communication node 202 may schedule normal NR wireless communication devices (or normal NR UEs) within the frequency range of initial DL BWP in RRC connected mode. In the idle mode, the normal NR wireless communication devices (or normal NR UEs) may camp in the initial DL BWP for paging monitoring. If the bandwidth of initial DL BWP configured for normal NR wireless communication devices (or normal NR UEs) is larger than the maximum UE bandwidth of reduced capability wireless communication devices (or reduced capability UEs), flexibly scheduled broadcast messages may be out of the reception capability (or reception frequency band) of the reduced capability wireless communication devices (or reduced capability UEs). Even for unicast within the reception capability and considering that the wireless communication node 202 may schedule the unicast traffic to different frequency locations within the initial DL BWP, the reduced capability wireless communication devices (or reduced capability UEs) may need to frequently retune to the corresponding frequency region to receive due to limited reception bandwidth.

Figure 4:
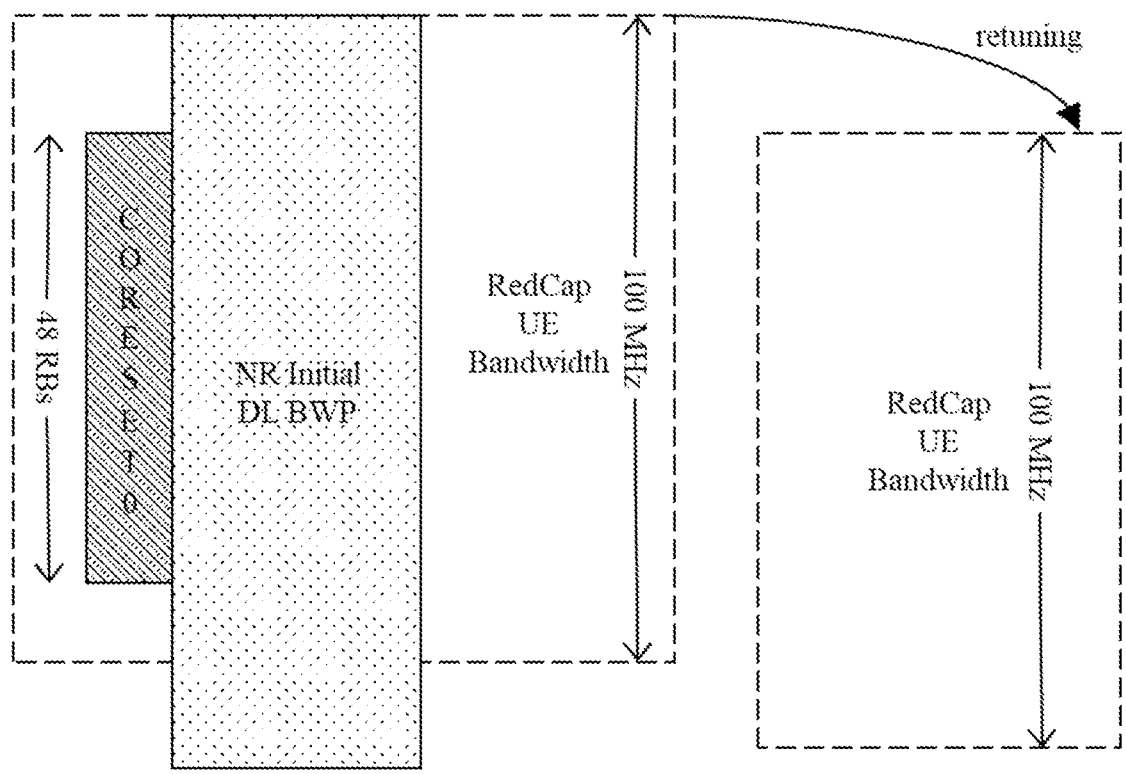
FIG. 4 illustrates an example scenario of RF retuning due to initial DL BWP being larger than the maximum UE bandwidth of a reduced capability wireless communication device.

Referring to FIG. 4, an example scenario of RF retuning due to initial DL BWP being larger than the maximum UE bandwidth of a reduced capability wireless communication device. The wireless communication devices (or UEs) 204 usually apply initial DL BWP after Msg4 reception. When the reduced capability and normal NR wireless communication devices (or UEs) share the same initial DL BWP configured for normal NR wireless communication devices (or UEs), the wireless communication node 202 may schedule physical downlink shared channel (PDSCH) transmission for the reduced capability wireless communication devices (or UEs) within the UE reception capability if the wireless communication device type can be identified before the PDSCH transmission. This is true even if the size of initial DL BWP is larger than the bandwidth of reduced capability wireless communication devices (or UEs). However, if the initial DL BWP configured for normal NR wireless communication devices (or UEs) is larger than the maximum bandwidth of reduced capability wireless communication devices (or UEs), RF retuning becomes unavoidable.

In the scenario illustrated in FIG. 4, the initial DL BWP configured for normal NR wireless communication devices (or UEs) is greater than 100 MHz, e.g., the maximum UE bandwidth of the reduced capability wireless communication device (RedCap UE). As such, the reduced capability wireless communication device (or UE) retunes to a new center frequency (or shifts its reception frequency band) to receive paging messages broadcast/transmitted outside the initial/current reception frequency band of the reduced capability wireless communication device (or UE).

Figure 5:
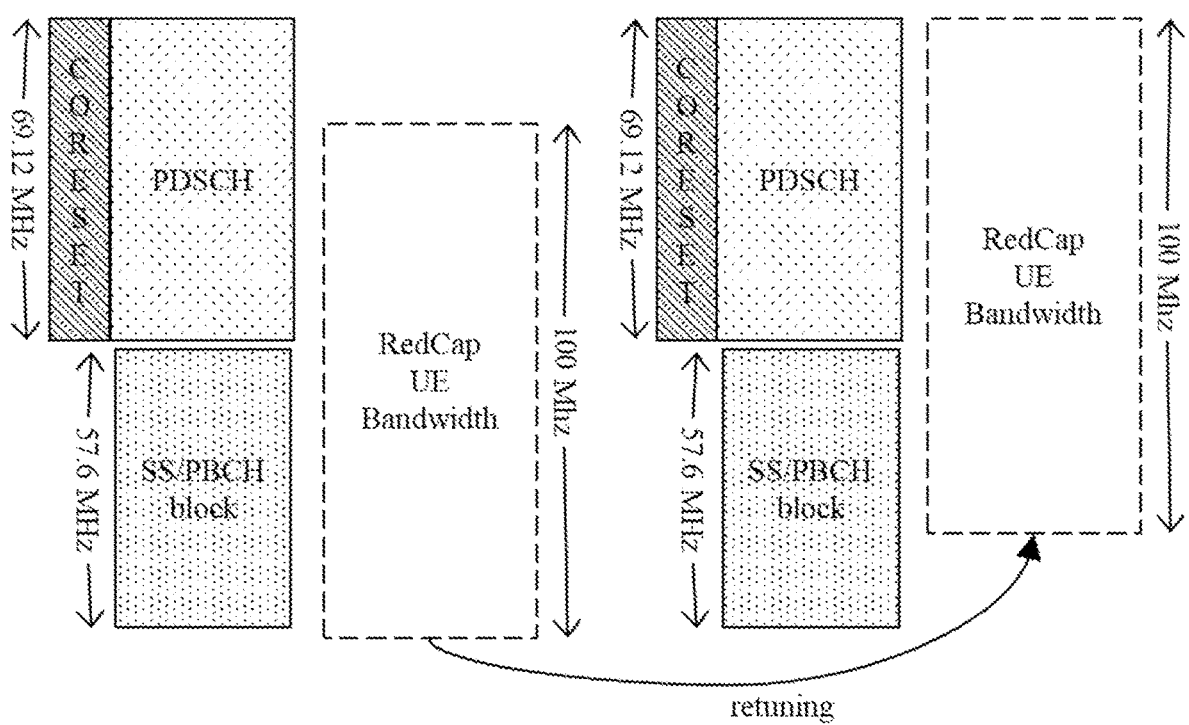
FIG. 5 illustrates an example RF retuning scenario to decode to both the physical broadcasting channel (PBCH) and CORESET0.

Referring to FIG. 5, an example RF retuning scenario to decode to both the physical broadcasting channel (PBCH) and CORESET0 is illustrated. In this scenario, the total bandwidth of SSB and CORESET0 (e.g., 126.72 MHz=57.6 MHz+69.12 MHz) is greater than the maximum UE bandwidth (e.g., 100 MHz) for reduced capability wireless communication devices. Given that the total bandwidth of SSB and CORESET0 is larger than the maximum UE bandwidth supported by a reduced capability wireless communication device (or reduced capability UE), the reduced capability wireless communication device (or reduced capability UE) may decode the PBCH and CORESET 0 in a time-division multiplexing (TDM) fashion over multiple opportunities. That is, the reduced capability wireless communication device (or reduced capability UE) may perform RF retuning to decode CORESET 0 after decoding the PBCH, as illustrated in FIG. 5. Frequent RF retuning results in delaying the initial cell search time and increasing the power consumption.

Figure 6:
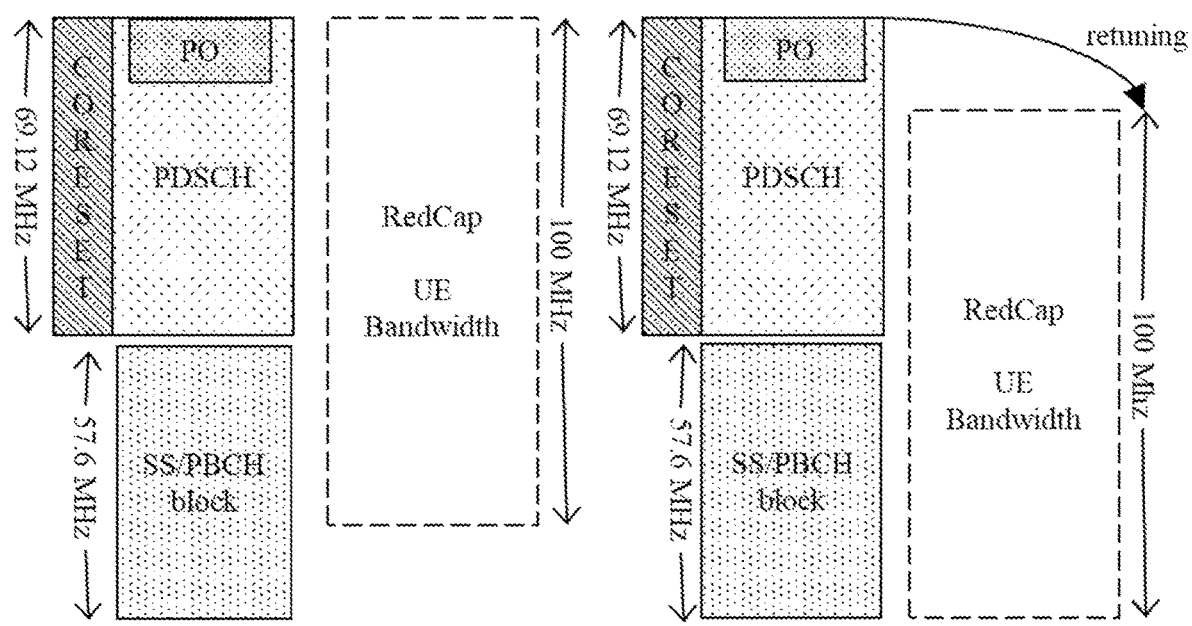
FIG. 6 illustrates an example RF retuning scenario associated with an idle mode of reduced capability wireless communication devices.

Referring to FIG. 6, an example RF retuning scenario associated with an idle mode of reduced capability wireless communication devices is illustrated. If the wireless communication node 202 configures paging occasions/instances/events for reduced capability wireless communication devices (or reduced capability UEs) to be within CORESET 0 associated with normal NR wireless communication devices (or normal NR UEs), a reduced capability wireless communication device (or reduced capability UE) in idle mode may monitor paging occasions/instances/events within the frequency range of CORESET 0. The reduced capability wireless communication device (or reduced capability UE) may frequently retune to the frequency range of SSB for SSB-based synchronization and/or radio resource management (RRM) measurement, as illustrated in FIG. 6. Such frequent retuning increases the UE power consumption.

When reduced capability and normal NR wireless communication devices (or UEs share the same paging occasion (PO) resources, reduced capability wireless communication devices (or UEs) would perform unnecessary paging PDSCH decoding if the paging message is not intended for wireless communication devices (or UEs). Also, when reduced capability wireless communication devices (or UEs) share/use the system information (SIs) for normal NR wireless communication devices (or UEs), some type of SIs (e.g., SIs intended for normal NR wireless communication devices only) may be useless for reduced capability wireless communication devices (or UEs). As such, decoding of such SIs by reduced capability wireless communication devices (or UEs) leads to unnecessary power consumption.

To avoid frequent RF retuning by reduced capability wireless communication devices (or reduced capability UEs), wireless communication nodes 202 may restrict configurations for normal NR wireless communication devices (or UEs) when the reduced capability and normal NR wireless communication devices (or UEs) share the same PO resources. For instance, the wireless communication nodes 202 may use/employ/configure only configurations supported by reduced capability wireless communication devices (or reduced capability UEs). However, such approach may significantly impact/degrade the performance of normal NR wireless communication devices (or UEs) due to restricted capability and reduced flexibility. This dilemma/tradeoff calls for ways to reduce the power consumption of reduced capability wireless communication devices, by reducing RF retuning and/or avoiding unnecessary decoding, while also reducing the impact on the performance of normal NR wireless communication devices (or UEs). In general, considering the above discussed problems, power consumption saving/reduction can be achieved especially for reduced capability wireless communication devices (or UEs).

Referring to FIG. 7, a flowchart illustrating a method 300 for wireless communication is shown, in accordance with some embodiments of the present disclosure. The method 300 may include a wireless communication node transmitting/sending/broadcasting, and a first wireless communication device receiving, a paging message within a frequency-domain resource (STEP 302). The frequency-domain resource may correspond to a CORESET configured for the first wireless communication device, and the first wireless communication device may be a reduced capability wireless communication device (or reduced capability UE device). The method 300 provides a solution to resolve the issue of frequent RF retuning for reduced capability wireless communication devices (or UEs) when in idle mode.

Reduced capability wireless communication devices (or UEs) may reuse the CORESET 0 configured for normal NR wireless communication devices (or UEs). The dedicated common CORESET for paging configured for reduced capability (RedCap) wireless communication devices (or UEs) is different from the CORESET (e.g., CORESET 0) configured for paging normal NR wireless communication devices (or UEs). In some implementations, the wireless communication node 202 may configure the frequency-domain resource to include system information (SI), a random access response (RAR) message and/or Msg4. As such and in response to receiving the paging message, the first wireless communication device can receive the system information (SI), RAR message and/or Msg4. The frequency-domain resource can include a whole CORESET 0 that is configured for one or more normal NR (not RedCap) wireless communication devices.

Figure 8:
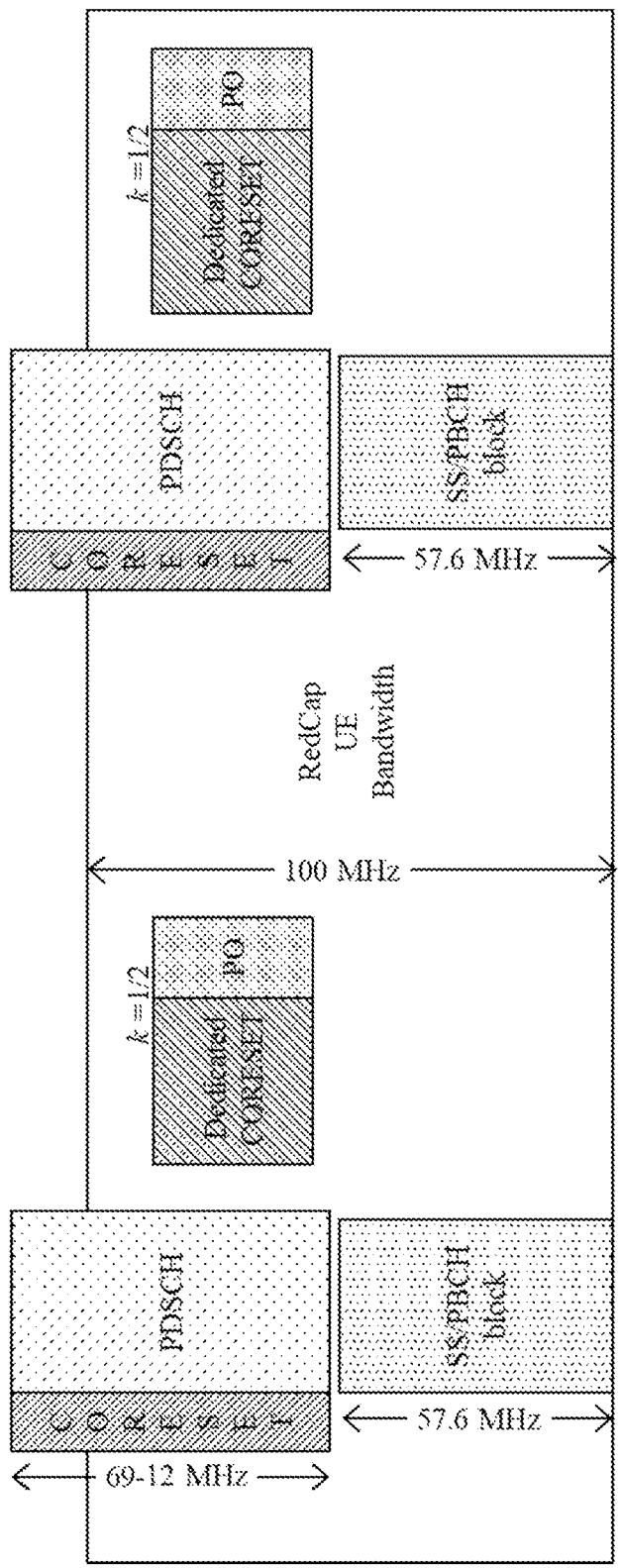
FIG. 8 illustrates an example configuration of dedicated common CORESET for paging reduced capability (Red-Cap) wireless communication devices within a bandwidth of CORESET 0, in accordance with some embodiments of the present disclosure.

Referring to FIG. 8, an example configuration of dedicated common CORESET for paging reduced capability (RedCap) wireless communication devices (or UEs) within a bandwidth of CORESET 0 is illustrated, in accordance with some embodiments of the present disclosure. For FR2 and SSB/CORESET 0 multiplexing pattern 2 and/or 3, the wireless communication node 202 may configure/arrange the dedicated common CORESET for paging reduced capability wireless communication devices (or UEs) within the bandwidth of CORESET 0 for paging normal NR wireless communication devices (or UEs). In some implementations, the wireless communication node 202 may configure/arrange the frequency-domain resource of the dedicated common CORESET for paging reduced capability wireless communication devices (or UEs) to be transmitted/broadcast within the bandwidth of CORESET 0, for example, adjacent to the SSB block as illustrated in FIG. 8. That is, the wireless communication node 202 may select a frequency range/region of the frequency bandwidth of CORSET 0 that is adjacent to SSB for transmitting/broadcasting/sending information associated with the dedicated common CORESET for paging reduced capability wireless communication devices (or UEs). The wireless communication node 202 may transmit/broadcast/send, the reduced capability wireless communication devices may receive, the information associated with the dedicated common CORESET for paging within the selected frequency range/region.

Arranging the frequency-domain resource of the dedicated common CORESET to be adjacent to SSB in the frequency domain allows the total bandwidth of the dedicated common CORESET for paging and SSB to be within the reception bandwidth of reduced capability wireless communication devices (or UEs). Such arrangement reduces/mitigates/eliminates unnecessary RF retuning by the reduced capability wireless communication devices (or UEs). The wireless communication node 202 may schedule/arrange paging of physical downlink shared channel (PDSCH) parameters for reduced capability wireless communication devices (or UEs) within the dedicated common CORESET for paging.

In some implementations, the wireless communication node 202 may choose/select/arrange a starting position of the frequency-domain resource to be aligned with a starting position of the CORESET 0, as illustrated in FIG. 8. For instance, the starting position of the frequency-domain resource may be equal to the physical resource block (PRB) having the lowest index among the PRBs of the CORESET 0 (or CORESET for Type0-PDCCH CSS set). Note that CORESET 0 is configured for normal NR (not reduced capability) wireless communication devices (or UEs). In some implementations, the wireless communication node 202 may choose/select/arrange the starting position of the frequency-domain resource to be aligned according at an offset (or a frequency offset) from the starting position of the CORESET 0. The wireless communication node 202 may select/determine the frequency offset based on the maximum bandwidth of the reduced capability wireless communication device (or UE), the size of SSB and/or the size of the dedicated common CORESET for paging. For example, the wireless communication node 202 may select/determine the frequency offset so that both SSB and the dedicated common CORESET for paging fall within the UE bandwidth of the reduced capability wireless communication device (or UE).

Figure 9:
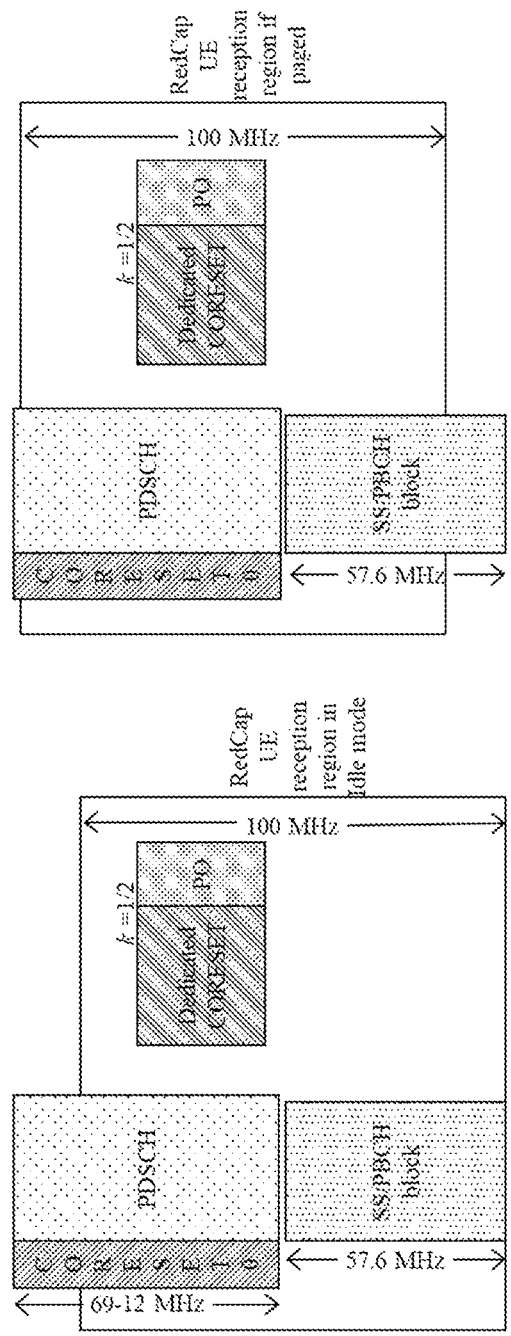
FIG. 9 illustrates an example RF retuning scenario from idle mode, in accordance with some embodiments of the present disclosure.

Referring to FIG. 9, an example RF retuning scenario from idle mode is illustrated, in accordance with some embodiments of the present disclosure. A reduced capability (RedCap) wireless communication device (or UE), while in idle mode, may camp in the frequency region including whole SS/PBCH block and dedicated common CORESET to monitor paging occasions/events. Once the wireless communication node 202 pages the RedCap wireless communication device (or UE), the RedCap wireless communication device (or UE) may adjust to the frequency region including the whole CORESET 0 by performing RF retuning. However, the RedCap wireless communication device (or UE) does not need to perform any RF retuning before being paged as the paging frequency range, e.g., whole SS/PBCH block and dedicated common CORESET, is within the reception frequency range of the RedCap wireless communication device (or UE) while camping. The camping and FR retuning scenario described in FIG. 9 can be applicable to any of the embodiments described with regard to FIGS. 7-10B.

Figure 10A:
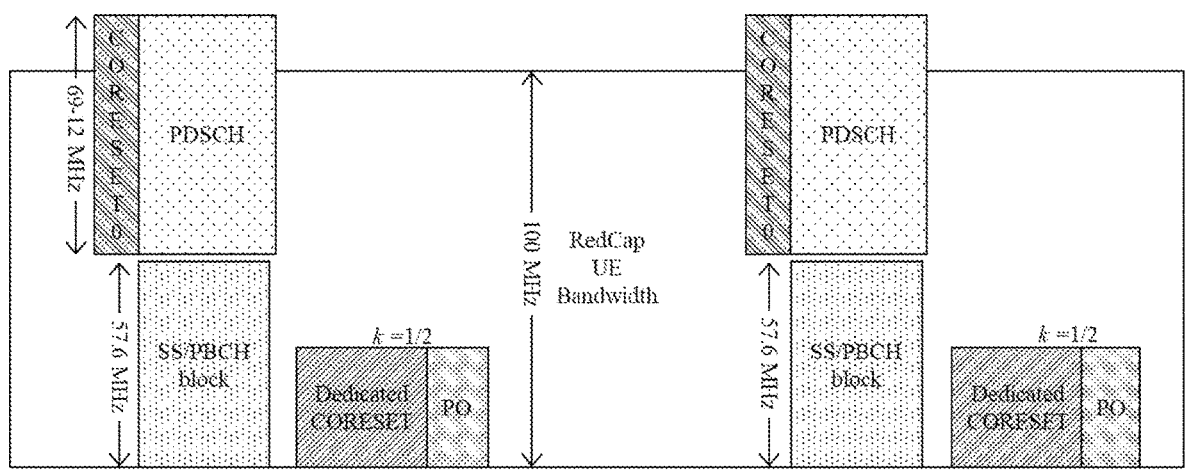
FIGS. 10A and 10B illustrate different alignments of a frequency-domain resource of the dedicated common CORESET with respect to SSB along the frequency domain.
Figure 10B:
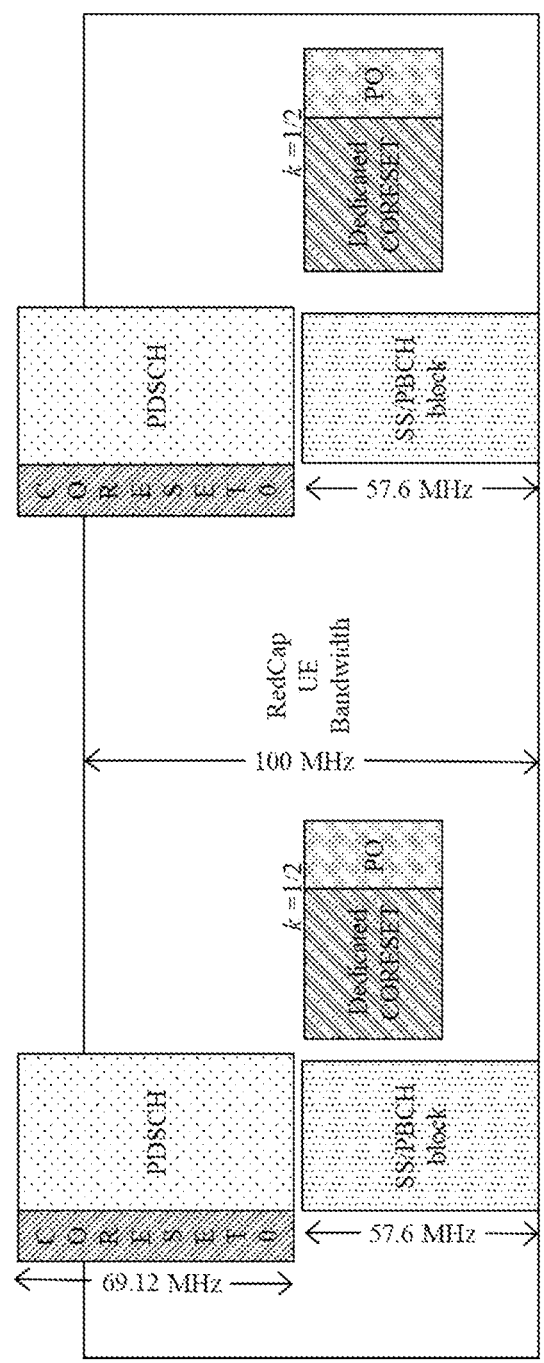

In some embodiments, the wireless communication node 202 may configure, e.g. for FR2 and SSB/CORESET 0 multiplexing pattern 2 and/or 3, the frequency domain resource of the dedicated common CORESET for paging RedCap wireless communication devices (or UEs) according to, using or based on the frequency location of SSB. Referring to FIGS. 10A and 10B, different scenarios for configuring the frequency-domain resource of the dedicated common CORESET for paging based on the frequency location of SSB are illustrated, according to some example embodiments of the present disclosure.

FIG. 10A illustrates a scenario where the wireless communication node 202 may configure/arrange/set a starting position (or smallest frequency) of the frequency-domain resource of the dedicated common CORESET for paging to be equal to (or aligned with) the lowest PRB of SSB or a starting position of the SSB along the frequency domain. FIG. 10B illustrates a scenario where the wireless communication node 202 may configure/arrange/set an ending position (or highest frequency) of the frequency-domain resource of the dedicated common CORESET for paging to be equal to (or aligned with) the highest PRB of SSB or an ending position of the SSB along the frequency domain. In some other implementations, the wireless communication node 202 may configure/arrange/set the starting position (or lowest frequency) of the frequency-domain resource of the dedicated common CORESET for paging to be equal to (or aligned at) a frequency offset from the smallest PRB of SSB or from the starting position of the SSB along the frequency domain. The wireless communication node 202 may configure/arrange/set the ending position (or highest frequency) of the frequency-domain resource of the dedicated common CORESET for paging to be equal to (or aligned at) a frequency offset from the highest PRB of SSB or from the ending position of the SSB along the frequency domain.

In some embodiments, the wireless communication node 202 may configure, e.g. for FR2 and SSB/CORESET 0 multiplexing pattern 2 and/or 3, the frequency-domain resource of the dedicated common CORESET by reusing a configuration method for normal NR wireless communication devices (or UEs). For instance, the wireless communication node 202 may use a 45-bit bitmap to configure the frequency-domain resource of dedicated common CORESET.

In some implementations, the wireless communication node 202 may define/determine/set the size (e.g., frequency range) of the dedicated common CORESET using a scaling factor k and the number of RBs configured for CORESET 0. For instance, the wireless communication node 202 may define/determine/set the size (e.g., frequency range) of the dedicated common CORESET to be equal to k×number of RBs configured for CORESET 0. In some implementations, the scaling factor k (or the ratio of the frequency-domain size of the frequency-domain resource to the frequency-domain size of the CORESET 0) may be one of 1, ½ or ¼. In some implementations, the wireless communication node 202 may define/determine/set the size (e.g., frequency range) of the dedicated common CORESET, or the size of the frequency-domain resource, to be within (or not larger than) the maximum bandwidth or the supported bandwidth of the first wireless communication device (or the maximum bandwidth of RedCap wireless communication devices). The wireless communication node 202 may employ any of these techniques for defining/determining/setting the size of the frequency-domain resource or the size of the dedicated common CORESET in combination with any of the embodiments described in this disclosure (e.g., in relation to FIGS. 7-10B).

Figure 11:
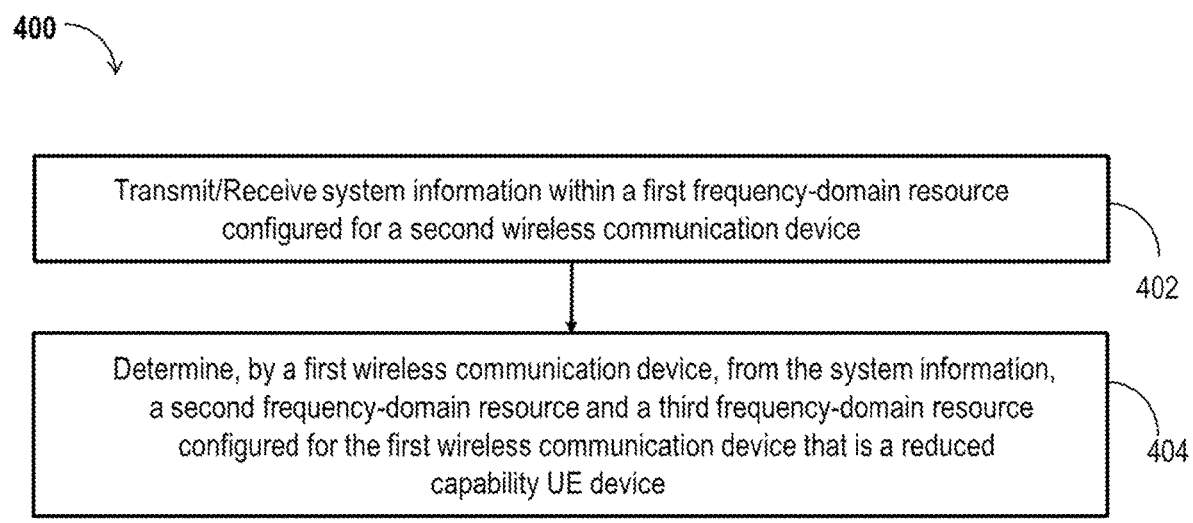
FIG. 11 shows a flowchart of another method of wireless communication, in accordance with some embodiments of the present disclosure.

Referring to FIG. 11, a flowchart of another method 400 of wireless communication is shown, in accordance with some embodiments of the present disclosure. In brief overview, the method 400 may include a wireless communication node transmitting/sending/broadcasting, and a first wireless communication device receiving, system information within a first frequency-domain resource configured for a second wireless communication device (STEP 402). For the first wireless communication device, the method 400 may include the first wireless communication device determining, from the system information, a second frequency-domain resource and a third frequency-domain resource configured for the first wireless communication device (STEP 404). The first wireless communication device may be a reduced capability (RedCap) wireless communication device (or UE). The second wireless communication device may be a normal NR (not RedCap) wireless communication device (or UE).

The method 400 may include the wireless communication node 202 transmitting/sending/broadcasting, and the first wireless communication device receiving, system information (SI) within a first frequency-domain resource configured for a second wireless communication device (STEP 402). For instance, the wireless communication node 202 may transmit/broadcast/send the first frequency-domain resource as part of, or within the bandwidth of, CORESET 0 configured for normal NR wireless communication devices (or UEs). In general, the first frequency-domain resource may correspond to a CORESET configured for normal NR (not RedCap) wireless communication devices. The RedCap wireless communication devices (or UEs), and the first wireless communication device in particular, may reuse the CORESET (e.g., CORSET 0) configured for normal NR wireless communication devices (or UEs), or decode information received therein. The wireless communication node 202 may separately configure the dedicated common CORESET for (RedCap) wireless communication devices (or UEs).

The method 400 may include the first wireless communication device determining, from the system information, a second frequency-domain resource and a third frequency-domain resource configured for the first wireless communication device (STEP 404). The first wireless communication device (or UE), and RedCap wireless communication devices (or UEs) in general, may reuse SSB, SIB 1 and/or other SIs in the CORESET (e.g., CORESET 0) configured for normal NR wireless communication devices (or UEs). The first wireless communication device (or UE) may decode SIB 1 and/or other SIs in the CORESET configured for normal NR wireless communication devices (or UEs). After successfully decoding SIB 1 and/or other SIs, the first wireless communication device (or UE), which is a RedCap wireless communication device (or UE), may acquire the configuration of dedicated common CORESET and/or dedicated initial DL BWP for reduced capability UEs and switch to the dedicated common CORESET to continue the initial access procedure. In general, the second frequency-domain resource may correspond to a BWP (e.g., initial DL BWP) and the third frequency-domain resource may correspond to a CORESET, such as the dedicated common CORESET. In some implementations, the third frequency-domain resource may be within the second frequency-domain resource.

Figure 12:
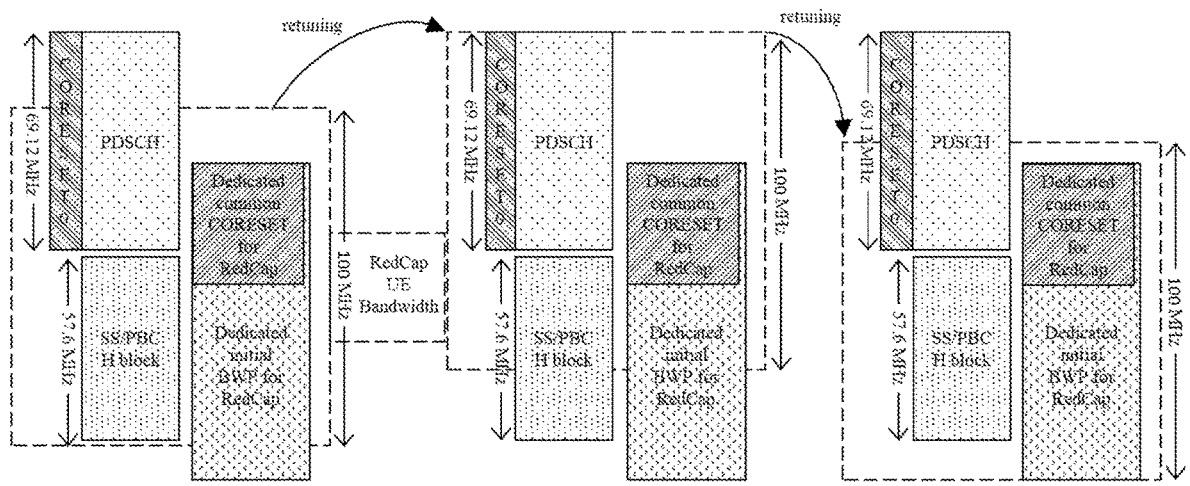
FIG. 12 is a diagram illustrating RF retuning responsive to changes in system information, in accordance with some embodiments of the present disclosure.

Referring to FIG. 12, a diagram illustrating RF retuning responsive to changes in system information is shown, in accordance with some embodiments of the present disclosure. The frequency-domain resource(s) of the dedicated common CORESET and/or dedicated DL initial BWP for RedCap wireless communication devices (or UEs) may include the frequency region of SS/PBCH blocks. Once wireless communication node 202 updates the system information, and the RedCap (or first) wireless communication device (or UE) is informed of such update, the RedCap wireless communication device (or UE) may perform RF retuning to switch to the CORESET (e.g., CORESET 0) configured for normal NR wireless communication devices (or UEs) to decode the updated system information. After acquiring/decoding SIB 1 and/or other SIs, the RedCap wireless communication device (or UE) may switch back to the dedicated DL initial BWP.

Figure 13:
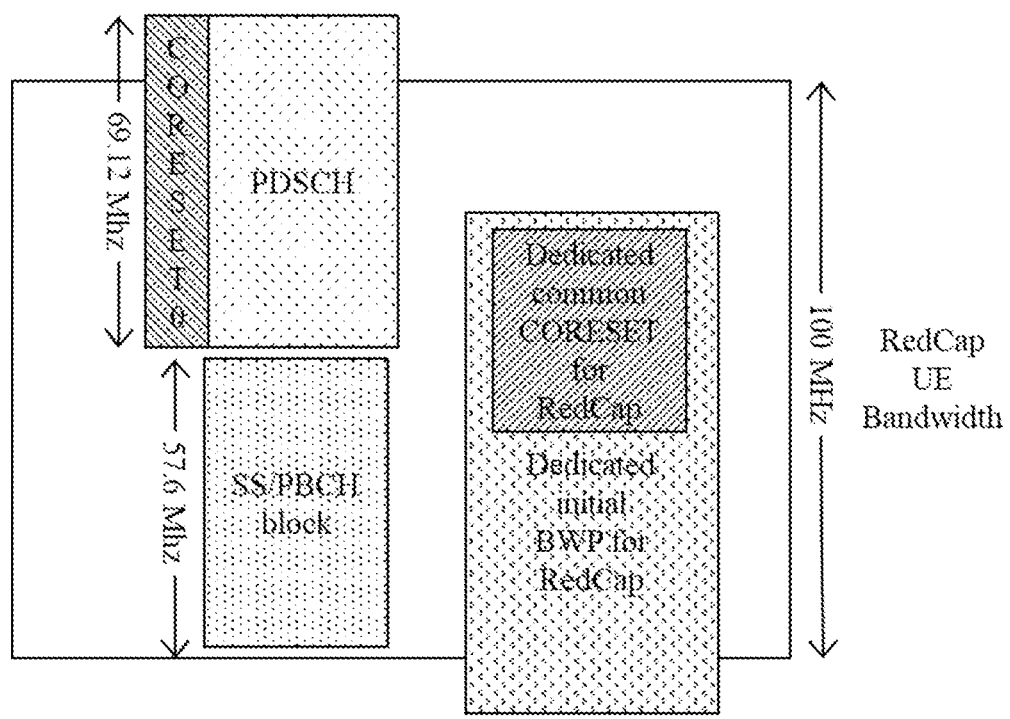
FIG. 13 illustrates an example scenario where frequency region of the dedicated initial DL BWP for RedCap wireless communication devices (or UEs) includes the whole frequency region of SSB.

In some implementations, the wireless communication node 202 may configure a dedicated initial DL BWP for RedCap wireless communication devices (or UEs) different from the initial DL BWP for normal NR wireless communication devices (or UEs), so that the frequency region of the dedicated initial DL BWP for RedCap wireless communication devices (or UEs) includes the whole frequency region of SSB. Referring to FIG. 13, an example scenario where frequency region of the dedicated initial DL BWP for RedCap wireless communication devices (or UEs) includes the whole frequency region of SSB. In some implementations, the wireless communication node 202 may configure/set/determine the size (or frequency range) of dedicated initial DL BWP for RedCap wireless communication devices (or UEs) to be within the maximum UE bandwidth of reduced capability UEs. In some implementations, the wireless communication node 202 may configure a frequency-domain resource of the dedicated common CORESET (e.g., the third frequency-domain resource) for reduced capability UEs to be arranged within the dedicated initial DL BWP (e.g., the second frequency-domain resource) for reduced capability UEs, as illustrated in FIGS. 12 and 13.

In some implementations, the first (or RedCap) wireless communication device, may monitor a downlink control information (DCI) within the third frequency-domain resource. The wireless communication node 202 may use DCI to schedule at least one of a RAR message, a Msg4, or a paging message. Specifically, the first (or RedCap) wireless communication device (or UE) may monitor DCIs scheduling RAR, Msg 4 and paging in the dedicated common CORESET configured for RedCap wireless communication device (or UEs). The wireless communication node 202 may schedule RAR messages, paging messages and/or Msg4 messages in the dedicated initial DL BWP.

After SSB detection, the first (or RedCap) wireless communication device (or UE) may decode SIB 1 and/or other SIs in the CORESET (e.g., CORESET 0) configured for normal NR wireless communication devices (or UEs). The first (or RedCap) wireless communication device (or UE) may apply parameters/configurations received in the dedicated initial DL BWP after success decoding of SIB1 and other SIs. The first (or RedCap) wireless communication device (or UE) may perform an initial access procedure in the dedicated initial DL BWP for reduced capability UEs. When in idle mode, the first (or RedCap) wireless communication device (or UE) may perform paging monitoring or SSB-based synchronization and measurement in the dedicated initial DL BWP.

In some implementations, the wireless communication node 202 may configure the dedicated DL BWP to include common messages, such as RAR messages, Msg4 messages and/or paging messages, for RedCap wireless communication devices (or UEs) different from the initial DL BWP configured for normal NR wireless communication devices (or UEs). The wireless communication node 202 may configure/set/determine the size of dedicated DL BWP for common messages (e.g., RAR, Msg4 and/or paging messages) for RedCap wireless communication devices (or UEs) to be within the maximum UE bandwidth of RedCap wireless communication devices (or UEs). The first (or RedCap) wireless communication device may receive a message scheduled in the second frequency-domain resource (e.g., dedicated DL BWP) including at least one of a RAR message, a Msg4 message and/or a paging message.

In some implementations, the wireless communication node 202 may configure the frequency domain resource of dedicated common CORESET (e.g., the third frequency-domain resource od method 400) for RedCap wireless communication devices (or UEs) to be within the dedicated DL BWP carrying common messages for RedCap wireless communication devices (or UEs). The wireless communication node 202 may schedule RAR messages, Msg4 messages and/or paging messages in the dedicated DL BWP for common messages (e.g., RAR messages, Msg4 messages and/or paging messages). The first (or RedCap) wireless communication device (or UE) may monitor DCIs scheduling RAR messages, Msg4 messages and/or paging messages in the dedicated common CORESET for RedCap wireless communication devices (or UEs).

Figure 14:
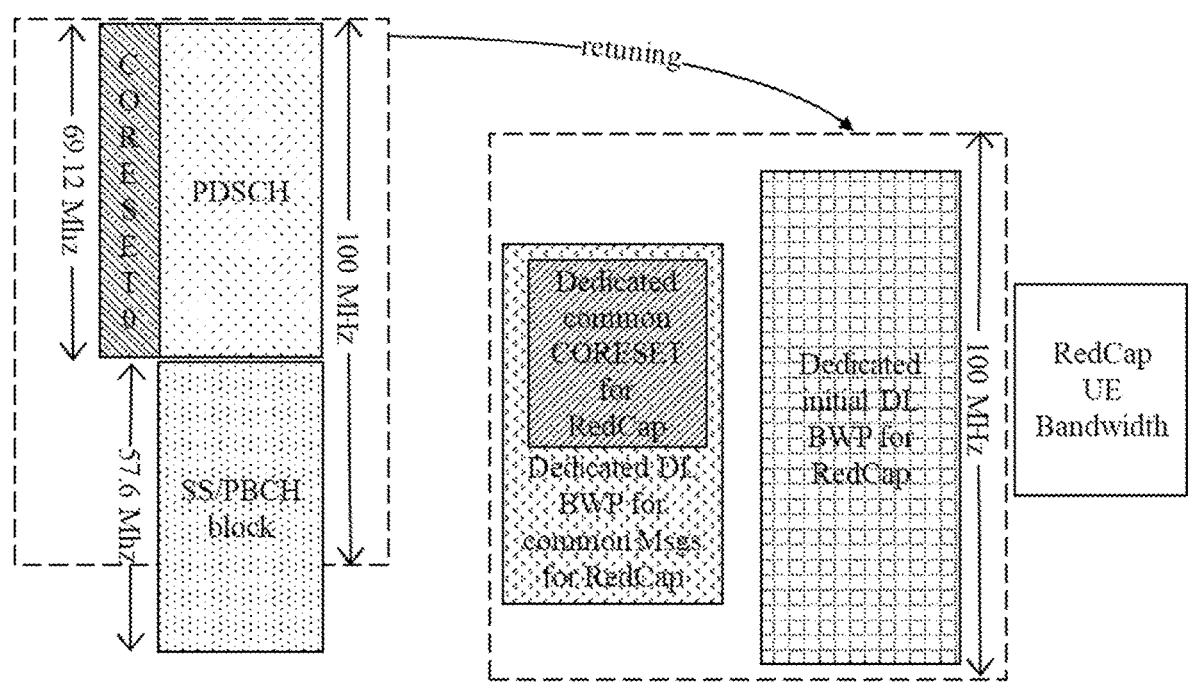
FIG. 14 illustrates an example scenario where the frequency region of dedicated initial DL BWP for RedCap wireless communication devices (or UEs) includes the whole frequency region of SSB, according to some example embodiments of the present disclosure.

In some implementations, the wireless communication node 202 may configure the frequency-domain resource of the dedicated initial DL BWP for reduced capability UEs so that the frequency region of dedicated initial DL BWP for RedCap wireless communication devices (or UEs) includes the whole frequency region of SSB. Referring to FIG. 14, an example scenario where the frequency region of dedicated initial DL BWP for RedCap wireless communication devices (or UEs) includes the whole frequency region of SSB is illustrated, according to some example embodiments of the present disclosure. The wireless communication node 202 may configure both the dedicated DL BWP for common messages and the dedicated initial DL BWP. The first wireless communication device (or UE) may use the dedicated DL BWP for the initial access procedure after SIB1/ SIs decoding. The first wireless communication device (or UE) may use the dedicated initial DL BWP for transmission in connected mode and paging monitoring while in idle mode.

After SSB detection, the first (or RedCap) wireless communication device (or UE) may decode SIB 1 and/or other SIs in CORESET0 configured for normal NR wireless communication devices (or UEs). A dedicated DL BWP for common messages for reduced capability UEs and/or a dedicated initial DL BWP for reduced capability UEs may be configured in SIB 1 or other SIs. After success decoding of SIB 1 and/or other SIs, if a dedicated DL BWP for common messages for reduced capability UEs is configured, the dedicated DL BWP for common messages for reduced capability UEs is applied to reduced capability UEs. The first (or RedCap) wireless communication device (or UE) may perform the initial access procedure in the dedicated DL BWP for common Messages for RedCap wireless communication devices (or UEs). In RRC connected mode, if UE specific BWP is not configured for the RedCap wireless communication devices (or UEs), the wireless communication node 202 may schedule the first (or RedCap) wireless communication device (or UE) within the frequency range of the dedicated initial DL BWP configured for the RedCap wireless communication devices (or UEs). In Idle mode, the first (or RedCap) wireless communication device (or UE) may perform paging monitoring or SSB-based synchronization and measurement in the dedicated DL BWP with common messages for the RedCap wireless communication devices (or UEs).

In some embodiments, a RedCap wireless communication device (or UE) may reuse the CORESET (e.g., CORESET 0) configured for normal NR wireless communication devices (or UEs). The RedCap wireless communication device (or UE) may apply dedicated initial DL BWP configured for RedCap wireless communication devices (or UEs) after reception of Msg4 message. The wireless communication node 202 may configure/determine/set the bandwidth of the dedicated initial DL BWP to be within the maximum UE bandwidth of RedCap wireless communication devices (or UEs) so that there is no scheduling restriction on RedCap wireless communication devices (or UEs) in the dedicated initial DL BWP.

Figure 15A:
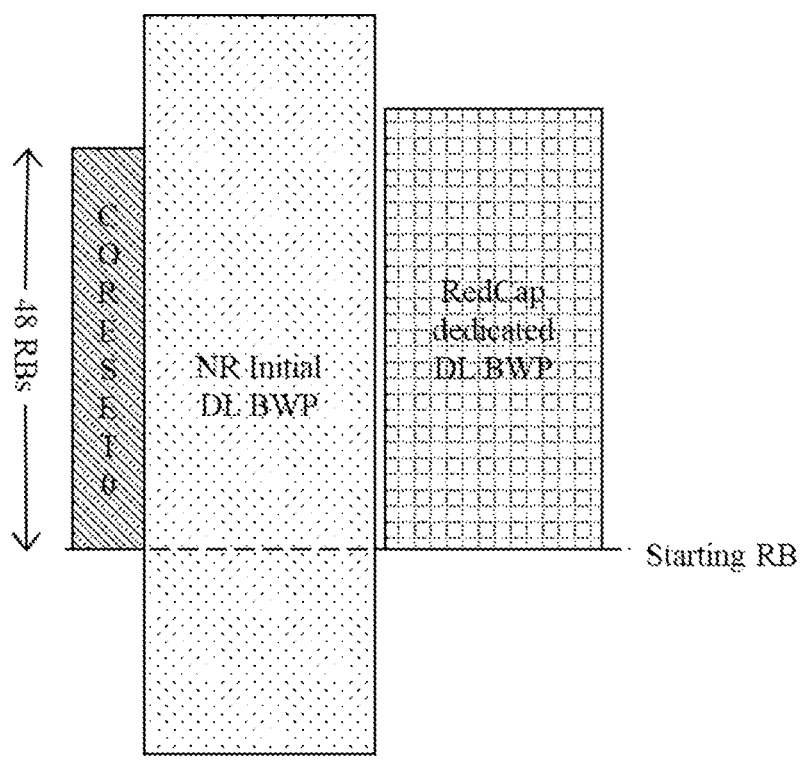
FIGS. 15A-15D illustrates various alignment scenarios of a dedicated initial DL BWP, according to some example embodiments of the present disclosure.

In some implementations, the wireless communication node 202 may configure the dedicated initial DL BWP for RedCap wireless communication devices (or UEs) if the size of initial DL BWP configured for normal NR wireless communication devices (or UEs) is larger than the UE maximum bandwidth. The wireless communication node 202 may set/determine/configure the starting RB (e.g., having the smallest index) of the dedicated initial DL BWP for RedCap wireless communication devices (or UEs) to be equal to, or aligned with, a PRB having the lowest index among PRBs of the CORESET (e.g., CORESET 0 or CORESET of Type0-PDCCH CSS set) for normal NR wireless communication devices (or UEs). Referring to FIG. 15A, an example scenario where the starting RB of the dedicated initial DL BWP is equal to, or aligned with, the starting PRB (e.g., having the lowest index) among the PRBs of CORESET 0 is illustrated.

Figure 15B:
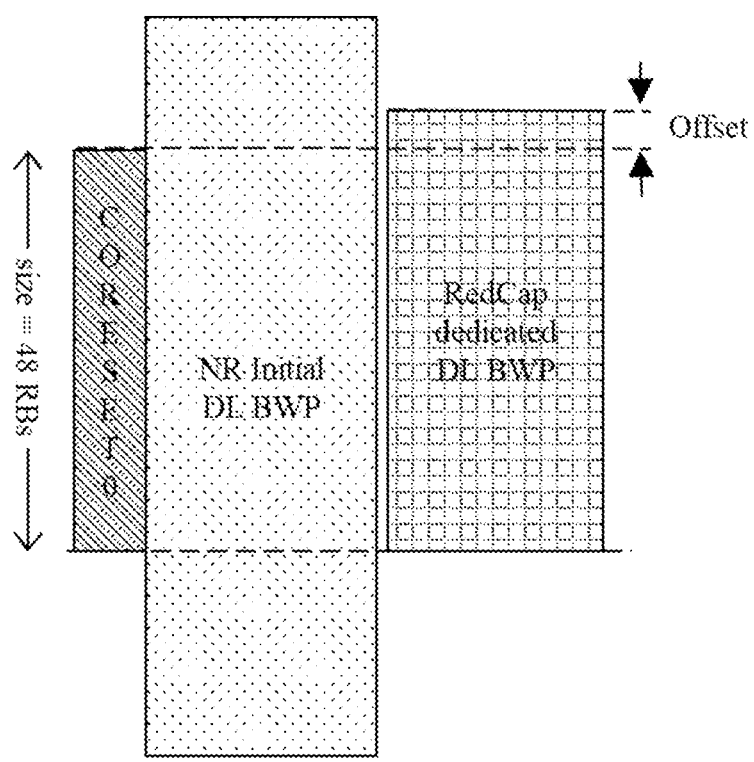

The wireless communication node 202 may set/determine/configure the size of dedicated initial DL BWP to be equal to the sum of the size of the CORESET (e.g., CORESET 0) configured for normal NR wireless communication devices (or UEs) and a dedicated offset. That is, the size of dedicated initial DL BP=size of CORESET 0+dedicated offset. Referring to FIG. 15B, an example scenario where the size of dedicated initial DL BP is equal to the sum of the size of CORESET 0 and a dedicated offset is illustrated. The wireless communication node 202 may signal/send/transmit/ broadcast the dedicated offset in system information, e.g., up to 7 bits. For FR1, a dedicated offset of up to 7 bits may cover an offset range of 0 to 85 RBs. For FR2, a dedicated offset of up to 7 bits may cover 0 to 90 RBs. In some implementations, the wireless communication node 202 may configure/set/arrange the last RB (e.g., with highest index) of the dedicated initial DL BWP to be equal to, or aligned with, the starting RB index of CORESET 0+size of CORESET 0+dedicated offset.

Figure 15C:
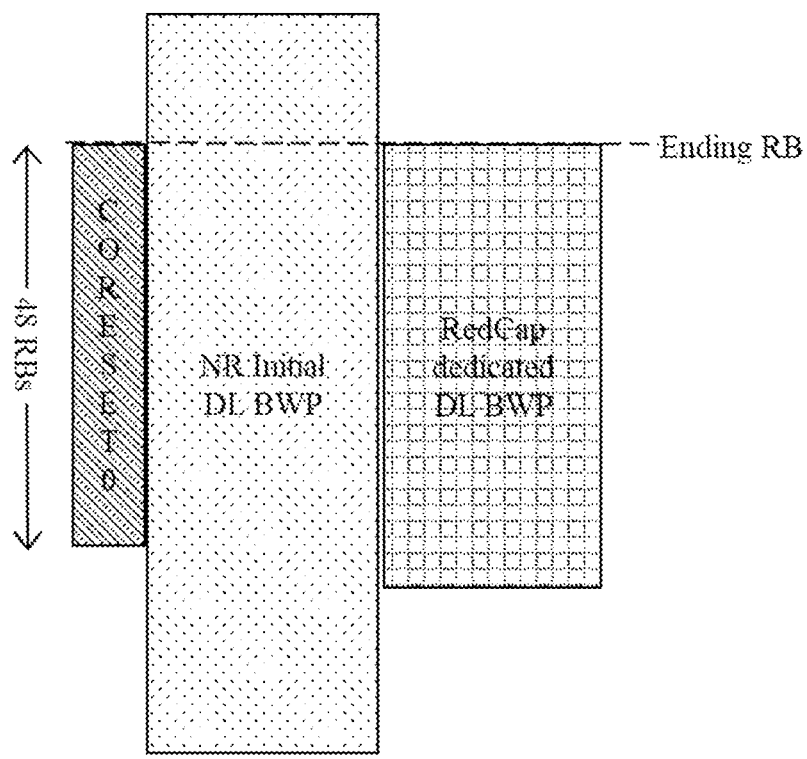

In some implementations, the wireless communication node 202 may configure the dedicated initial DL BWP for RedCap wireless communication devices (or UEs) if the size of initial DL BWP configured for normal NR wireless communication devices (or UEs) is larger than the UE maximum bandwidth. The wireless communication node 202 may configure/set an ending RB (e.g., having the highest index) of the dedicated initial DL BWP for RedCap wireless communication devices (or UEs) to be equal to an ending PRB (e.g., with the highest index) among PRBs of the CORESET (e.g., CORESET 0 or CORESET of Type0-PDCCH CSS set) for normal NR wireless communication devices (or UEs). Referring to FIG. 15C, an example scenario where the ending RB of the dedicated initial DL BWP is equal to, or aligned with, the ending PRB (e.g., with the highest index) among PRBs of the CORESET0, is illustrated.

Figure 15D:
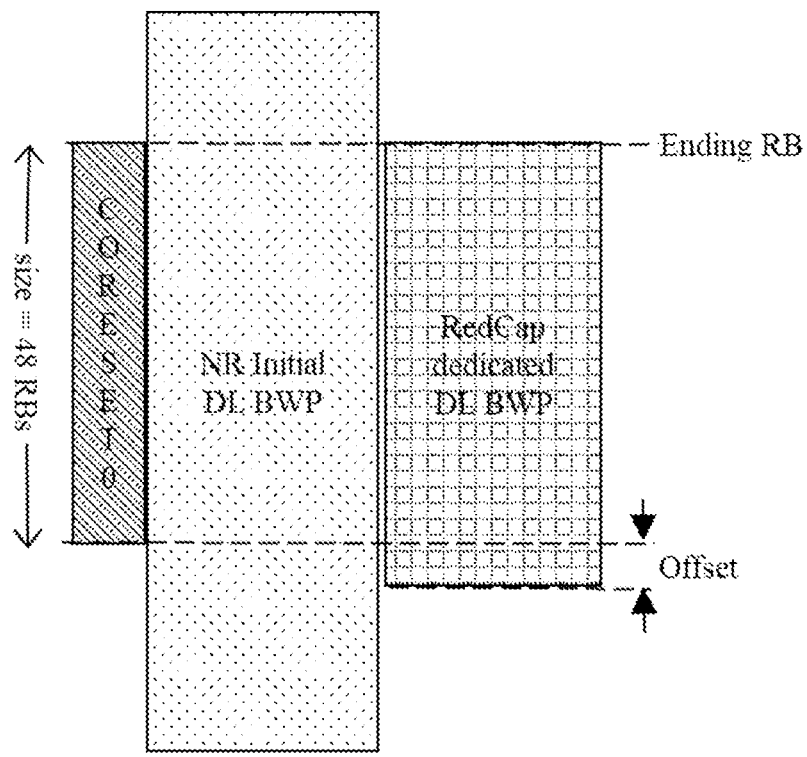
Figure 16A:
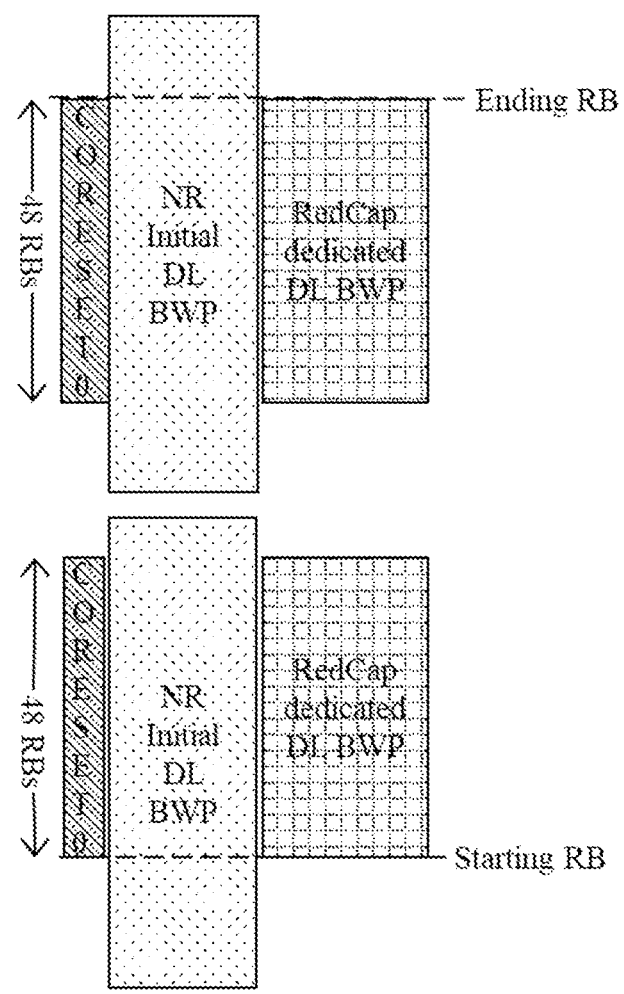
FIGS. 16A-16B illustrate example scenarios of alignment and signaling of the size of the dedicated initial DL BWP, according to some example embodiments of the present disclosure.

The wireless communication node 202 may configure/set/determine the size of the dedicated initial DL BWP to be equal to the sum of the size the CORESET (e.g., CORESET 0) configured for normal NR wireless communication devices (or UEs) and a dedicated offset. That is size of dedicated initial DL BP=size of CORESET 0+dedicated offset. Referring to FIG. 15D, another example scenario where the size of the dedicated initial DL BWP is equal to the sum of the size the CORESET0 and a dedicated offset is illustrated. The wireless communication node 202 may signal/transmit/broadcast, and the RedCap wireless communication device (or UE) may receive, the dedicated offset (e.g., up to 7 bits) in system information. For FR1, a dedicated offset of up to 7 bits may cover an offset range of 0 to 85 RBs. For FR2, a dedicated offset of up to 7 bits may cover 0 to 90 RBs. In some implementations, the wireless communication node 202 may configure/set/arrange the starting RB index (e.g., the lowest index) of the dedicated initial DL BWP to be equal to the ending RB index of CORESET 0 minus the size of CORESET 0 minus the dedicated offset In some implementations, the wireless communication node 202 may configure the dedicated initial DL BWP for RedCap wireless communication devices (or UEs) if the size of the initial DL BWP configured for normal NR wireless communication devices (or UEs) is larger than the UE maximum bandwidth. The wireless communication node 202 may (i) configure/set/determine the ending RB of the dedicated initial DL BWP for RedCap wireless communication devices (or UEs) to be equal to a PRB with the highest index among PRBs of the CORESET (e.g., CORESET 0 or CORESET of Type0-PDCCH CSS set) for normal NR wireless communication devices (or UEs), or (ii) configure the starting RB of the dedicated initial DL BWP for RedCap wireless communication devices (or UEs) is equal to a PRB with the lowest index among PRBs of the CORESET (e.g., CORESET 0 or CORESET of Type0-PDCCH CSS set) for normal NR wireless communication devices (or UEs). Referring to FIG. 16A, an example scenario where either the ending RB of the dedicated initial DL BWP is equal to or aligned with the PRB with the highest index among PRBs of CORESET 0, or the starting RB of the dedicated initial DL BWP is equal to the PRB with the lowest index among PRBs of CORESET 0 is illustrated.

Figure 16B:
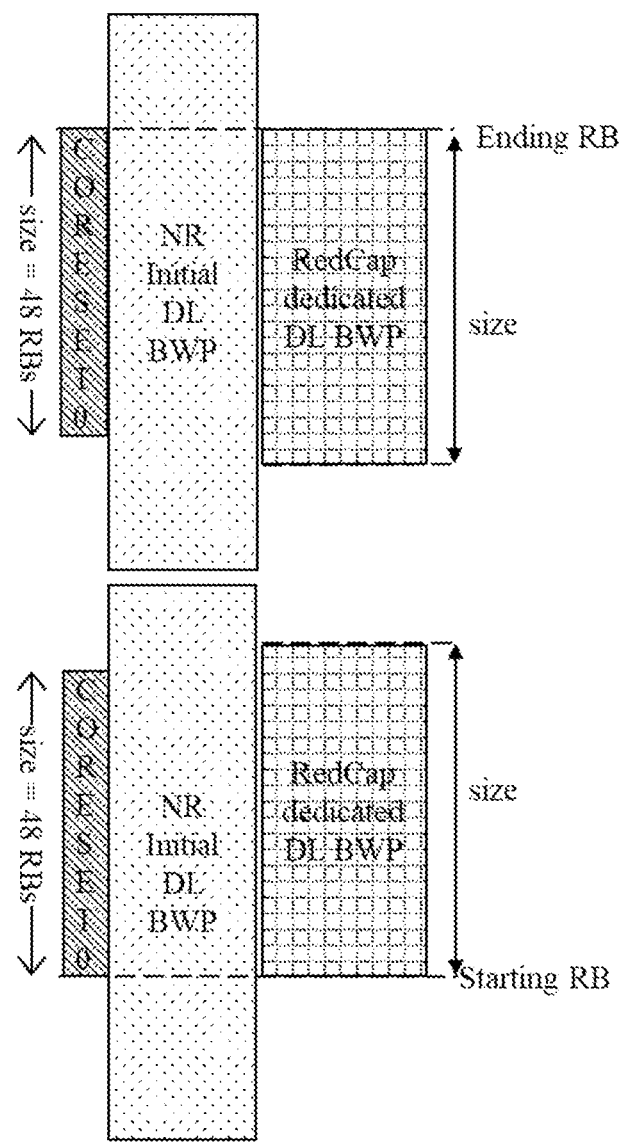

The wireless communication node 202 may signal/transmit/send, and the RedCap wireless communication device may receive, the size of the dedicated initial DL BWP in system information. Referring to FIG. 16B, example scenarios of signaling the size of the dedicated initial DL BWP in system information are illustrated. For FR1, a size of up to 7 bits may cover a size range from 0 to 110 RBs. For FR2, a size of up to 8 bits may cover a size range from 0 to 138 RBs.

Figure 17:
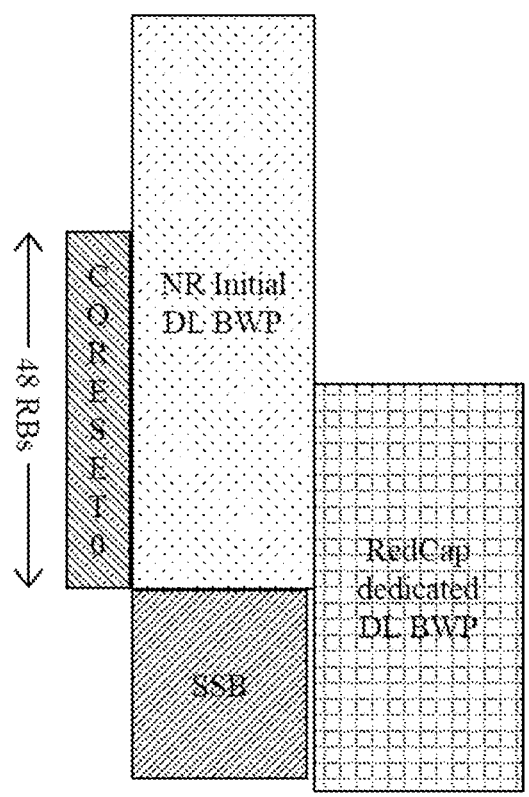
FIG. 17 illustrates an example scenario where the frequency region/range of the dedicated initial DL BWP includes the frequency region/range of SSB is illustrated.

In some implementations, the wireless communication node 202 may configure the dedicated initial DL BWP for RedCap wireless communication devices (or UEs) if the size of the initial DL BWP configured for normal NR wireless communication devices (or UEs) is larger than the UE maximum bandwidth. The wireless communication node 202 may configure/set the frequency region (or frequency range) of the dedicated initial DL BWP for RedCap wireless communication devices (or UEs) to include frequency region of SSB. Referring to FIG. 17, an example scenario where the frequency region/range of the dedicated initial DL BWP includes the frequency region/range of SSB is illustrated. The wireless communication node 202 may configure/set/determine the ize of the dedicated initial DL BWP for RedCap wireless communication devices (or UEs) to be less than the maximum UE bandwidth for RedCap wireless communication devices (or UEs).

Figure 18:
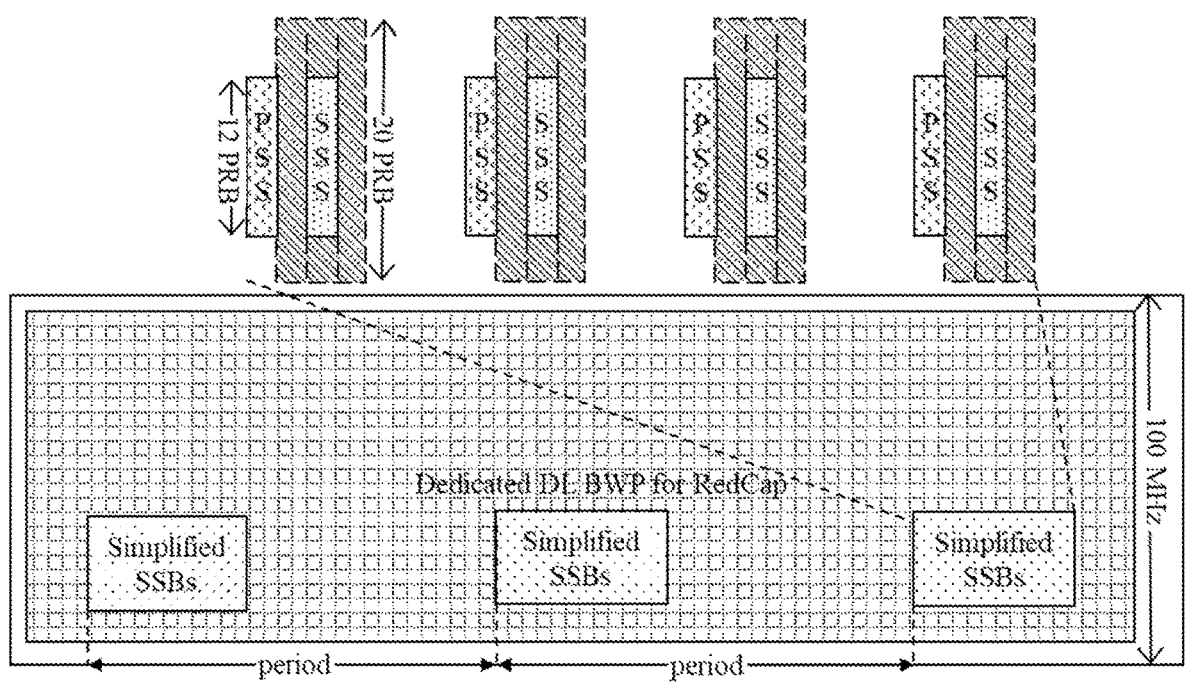
FIG. 18 is a diagram illustrating configuration of simplified SSBs with the dedicated DL BWP, according to some example embodiments of the present disclosure.

In some embodiments, the wireless communication node 202 may configure simplified SSBs within the dedicated DL BWP for RedCap wireless communication devices (or UEs) if legacy SSBs are not included in the dedicated DL BWP. The RedCap wireless communication devices (or UEs) receive the simplified SSBs configured in the in the dedicated DL BWP. This approach allows for support of SSB-based radio link monitoring, synchronization or measurement. Referring to FIG. 18, a diagram illustrating configuration of simplified SSBs with the dedicated DL BWP is shown, according to some example embodiments of the present disclosure.

Figure 19:
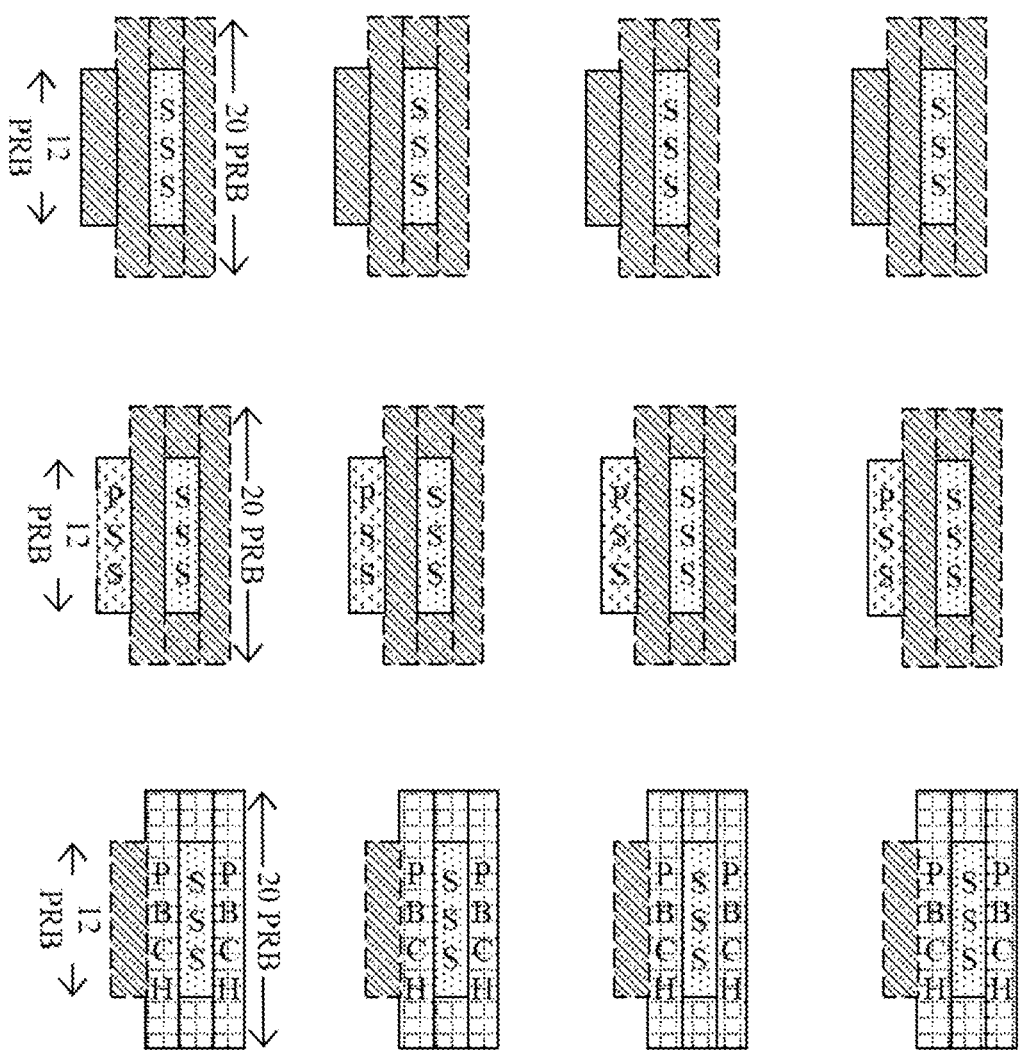
FIG. 19, various examples of simplified SSB are illustrated, according to some example embodiments of the present disclosure.

In some implementations, the wireless communication node 202 may configure the dedicated DL BWP for RedCap wireless communication devices (or UEs) so that the size of the dedicated DL BWP ise less than the maximum UE bandwidth of RedCap wireless communication devices (or UEs). The wireless communication node 202 may configure the dedicated active DL BWP for RedCap wireless communication devices (or UEs) to include simplified SSB if legacy SSB is not included in the dedicated active DL BWP. Note that Rel-15 requires that the SSB bandwidth should be reused, and any changes to the L1 control layer are to be minimized. The simplified SSB may reuse the structure of legacy SSB. Referring to FIG. 19, various examples of simplified SSB are illustrated, according to some example embodiments of the present disclosure. A simplified SSB may include only secondary synchronization signals (SSSs) as illustrated in upper row of FIG. 19, primary synchronization signals (PSSs) and SSSs as illustrated middle row of FIG. 19, or SSSs and PBCH as illustrated in the last or lower row of FIG. 19. The wireless communication node 202 may configure the transmission period for simplified SSBs. For instance, the transmission period for simplified SSBs may be 160 ms, 320 ms or 640 ms. The wireless communication node 202 may configure/transmit one or multiple simplified SSBs in each transmission period. The wireless communication node 202 may configure each simplified SSB within a transmission period is configured to be transmitted in associated physical random access channel (PRACH) transmission occasion.

Referring to FIG. 20, a flowchart illustrating a method 500 for wireless communication is shown, according to some example embodiments of the present disclosure. In brief overview, the method 500 may include transmitting/receiving a downlink control information that is configured to schedule a message (STEP 502). The downlink control information may use one or more reserved bits to indicate at least one of whether the scheduled message is applicable for RedCap wireless communication devices (or UEs), or for which type of RedCap wireless communication devices (or UEs) the scheduled message is applicable.

The method 500 may include the wireless communication node transmitting, or a wireless communication device (or UE) receiving, a downlink control information (DCI) that is configured to schedule a message (STEP 502). The wireless communication node 202 may use reserved bits in DCI to indicate/signal whether the scheduled physical downlink shared channel (PDSCH) is for RedCap wireless communication devices (or UEs) or for what type of RedCap wireless communication devices (or UEs). The wireless communication devices (or UE) may receive the DCI, and use the reserved bits in DCI to determine whether the scheduled PDSCH is for RedCap wireless communication devices (or UEs) or for what type of RedCap wireless communication devices (or UEs). Based on the determination, the wireless communication device (or UE) may decide whether or not decode the PDSCH. As such, a RedCap wireless communication device (or UE) can avoid unnecessary PDSCH decoding, and therefore consume power. The scheduled message may include at least one of a scheduled paging message or a scheduled System Information (SI) message. In fact, if RedCap wireless communication devices (or UEs) and normal NR wireless communication devices (or UEs) share the same PO resources, RedCap wireless communication devices (or UEs) may perform unnecessary paging PDSCH decoding may be performed when the paging message is not for RedCap wireless communication devices (or UEs).

In some implementations, the wireless communication node 202 may use, for DCI format 1_0 with cyclic redundancy check (CRC) scrambled by paging radio network temporary identifier (P_RNTI), one reserved bit to indicate whether or not the scheduled PDSCH is for RedCap wireless communication devices (or UEs). For example, a bit value equal to 0 may indicate that the scheduled PDSCH is not for RedCap wireless communication devices (or UEs), whereas a bit value equal to 1 may indicate that the scheduled PDSCH is for RedCap wireless communication devices (or UEs). If the bit value or the UE type filed indicates that the scheduled paging is for RedCap wireless communication devices (or UEs), a RedCap wireless communication device receiving the DCI may assume a predefined number of repetitions of the DCI and paging PDSCH scheduled by the DCI. If the UE type field in DCI indicates that the scheduled paging PDSCH is not for RedCap wireless communication devices (or UEs), the RedCap wireless communication device would not decode the corresponding PDSCH.

In some implementations, the wireless communication node 202 may use, for DCI format 1_0 with cyclic redundancy check (CRC) scrambled by P_RNTI, two reserved bits to indicate the UE type for the scheduled PDSCH. If UE type field in DCI matches the UE type of a the RedCap wireless communication device receiving the DCI, the RedCap wireless communication device receiving the DCI may assume a predefined number of repetitions of the DCI and paging PDSCH scheduled by the DCI. If the UE type field in DCI does not match the UE type of RedCap wireless communication device receiving the DCI, the RedCap wireless communication device would not decode the corresponding PDSCH. Table 1 below shows an example assignment of four different two-bit values to the UE type field.

TABLE 1

| UE type | Description |
| --- | --- |
| 00 | The scheduled paging message is not for any type of RedCap UEs |
| 01 | The scheduled paging message is for Type 1 RedCap UEs |
| 10 | The scheduled paging message is for Type 2 RedCap UEs |
| 11 | The scheduled paging message is for Type 1 and Type 2 RedCap UEs |

In some implementations, the wireless communication node 202 may use, for DCI format 1_0 with cyclic redundancy check (CRC) scrambled by SI RNTI, one reserved bit to indicate whether the scheduled SI message is valid for RedCap wireless communication devices (or UEs), e.g., validity for RedCap. If the validity for RedCap field or UE type field indicates that the scheduled SI message is for RedCap wireless communication devices (or UEs), The RedCap wireless communication device (or UE) may assume a predefined number of repetitions of the DCI and SI PDSCH scheduled by the DCI. If validity for RedCap field or UE type field in DCI indicates that the scheduled SI PDSCH is not for RedCap wireless communication devices (or UEs), the RedCap wireless communication device (or UE) receiving the DCI would not decode the corresponding PDSCH. For example, a bit value of 0 may indicate that the scheduled SI message is not for RedCap wireless communication devices (or UEs), whereas a bit value of 1 may indicate that the scheduled SI message is for RedCap wireless communication devices (or UEs).

In some implementations, the wireless communication node 202 may use, for DCI format 1_0 with cyclic redundancy check (CRC) scrambled by SI RNTI, two reserved bits to indicate whether the UE type for the scheduled SI message. If the UE type field in DCI matches the UE type of the RedCap wireless communication device (or UE) receiving the DCI, the RedCap wireless communication device (or UE) may assume a predefined number of repetitions of the DCI and SI PDSCH scheduled by the DCI. If the UE type field in DCI does not match the UE type of the RedCap wireless communication device (or UE) receiving the DCI, the RedCap wireless communication device (or UE) would not decode the corresponding PDSCH. Table 2 below shows an example assignment of four different two-bit values to the UE type field.

TABLE 2

| UE type | Description |
| --- | --- |
| 00 | The scheduled SI message is not valid for reduced capability UEs |
| 01 | The scheduled SI message is valid for type 1 reduced capability UEs |
| 10 | The scheduled SI message is valid for type 2 reduced capability UEs |
| 11 | The scheduled SI message is valid for type 1 and type 2 reduced capability UEs |

The various embodiments described above and in the claims can be implemented as computer code instructions that are executed by one or more processors of the wireless communication device (or UE) or the wireless communication node 202. A computer-readable medium may store the computer the computer code instructions.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A wireless communication method, comprising:
   receiving, by a first wireless communication device from a wireless communication node, a paging message within a frequency-domain resource,
   wherein the frequency-domain resource corresponds to a control resource set (CORESET) configured for the first wireless communication device,
   wherein the first wireless communication device is a reduced capability user equipment (UE) device in an idle mode, and
   wherein a total bandwidth of the CORESET and a synchronization signal block (SSB) broadcasting information associated with the CORESET is within a reception bandwidth of the first wireless communication device.

2. The wireless communication method of claim 1, wherein a starting position of the frequency-domain resource is aligned with a starting position of a CORESET 0, and wherein the CORESET 0 is configured for a second wireless communication device that is not a reduced capability UE device.

3. The wireless communication method of claim 2, wherein a ratio of a frequency-domain size of the frequency-domain resource to a frequency-domain size of the CORESET 0 is one of: 1, 1/2, and 1/4.

4. The wireless communication method of claim 1, wherein a starting position of the frequency-domain resource is aligned with a starting position of the SSB along a frequency domain.

5. The wireless communication method of claim 1, wherein an ending position of the frequency-domain resource is aligned with an ending position of the SSB along a frequency domain.

6. The wireless communication method of claim 1, wherein a starting position of the frequency-domain resource is an offset from a starting position of a CORESET 0 or a starting position of the SSB, and wherein the offset is configured in a system information.

7. The wireless communication method of claim 1, further comprising:
   in response to receiving the paging message, receiving system information, or a random access response (RAR) message or Msg4 in a frequency-domain resource including a whole CORESET 0 that is configured for a second wireless communication device,
   wherein the second wireless communication device is not a reduced capability UE device.

8. A wireless communication method, comprising:
   transmitting, by a first wireless communication node to a first wireless communication device a paging message within a frequency-domain resource,
   wherein the frequency-domain resource corresponds to a control resource set (CORESET) configured for the first wireless communication device,
   wherein the first wireless communication device is a reduced capability user equipment (UE) device in an idle mode, and wherein a total bandwidth of the CORESET and a synchronization signal block (SSB) broadcasting information associated with the CORESET is within a reception bandwidth of the first wireless communication device.

9. The wireless communication method of claim 8, wherein a starting position of the frequency-domain resource is aligned with a starting position of a CORESET 0, and wherein the CORESET 0 is configured for a second wireless communication device that is not a reduced capability UE device.

10. The wireless communication method of claim 9, wherein a ratio of a frequency-domain size of the frequency-domain resource to a frequency-domain size of the CORESET 0 is one of: 1, 1/2, and 1/4.

11. The wireless communication method of claim 8, wherein a starting position of the frequency-domain resource is aligned with a starting position of the SSB along a frequency domain.

12. The wireless communication method of claim 8, wherein an ending position of the frequency-domain resource is aligned with an ending position of the SSB along a frequency domain.

13. The wireless communication method of claim 8, wherein a starting position of the frequency-domain resource is an offset from a starting position of a CORESET 0 or a starting position of the SSB, and wherein the offset is configured in a system information.

14. The wireless communication method of claim 8, further comprising:
transmitting system information, RAR message or Msg4 in a frequency-domain resource including a whole CORESET 0 that is configured for a second wireless communication device,
wherein the second wireless communication device is not a reduced capability UE device.

15. A wireless communication device, comprising:
at least one processor configured to:
receive, via a receiver from a wireless communication node, a paging message within a frequency-domain resource,
wherein the frequency-domain resource corresponds to a control resource set (CORESET) configured for the wireless communication device,
wherein the wireless communication device is a reduced capability user equipment (UE) device in an idle mode, and
wherein a total bandwidth of the CORESET and a synchronization signal block (SSB) broadcasting information associated with the CORESET is within a reception bandwidth of the wireless communication device.

16. The wireless communication device of claim 15, wherein the wireless communication device is a first wireless communication device, and wherein a starting position of the frequency-domain resource is aligned with a starting position of a CORESET 0, and wherein the CORESET 0 is configured for a second wireless communication device that is not a reduced capability UE device.

17. A wireless communication node, comprising:
at least one processor configured to:
transmit, via a transmitter to a first wireless communication device, a paging message within a frequency-domain resource,
wherein the frequency-domain resource corresponds to a control resource set (CORESET) configured for the first wireless communication device,
wherein the first wireless communication device is a reduced capability user equipment (UE) device in an idle mode, and
wherein a total bandwidth of the CORESET and a synchronization signal block (SSB) broadcasting information associated with the CORESET is within a reception bandwidth of the first wireless communication device.

18. The wireless communication node of claim 17, wherein a starting position of the frequency-domain resource is aligned with a starting position of a CORESET 0, and wherein the CORESET 0 is configured for a second wireless communication device that is not a reduced capability UE device.

* * * * *